United States Patent
Waas

(10) Patent No.: US 7,984,043 B1
(45) Date of Patent: Jul. 19, 2011

(54) SYSTEM AND METHOD FOR DISTRIBUTED QUERY PROCESSING USING CONFIGURATION-INDEPENDENT QUERY PLANS

(75) Inventor: Florian M. Waas, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 812 days.

(21) Appl. No.: 11/782,370

(22) Filed: Jul. 24, 2007

(51) Int. Cl.
*G06F 7/00* (2006.01)
*G06F 17/30* (2006.01)

(52) U.S. Cl. ............... 707/718; 707/770; 707/966

(58) Field of Classification Search ............ 707/718, 707/770, 966, 999.003, 999.01
See application file for complete search history.

(56) References Cited

U.S. PATENT DOCUMENTS

| | | | |
|---|---|---|---|
| 6,499,026 B1 * | 12/2002 | Rivette et al. ............... | 1/1 |
| 6,879,977 B2 | 4/2005 | Huffman et al. | |
| 6,915,290 B2 | 7/2005 | Bestgen et al. | |
| 6,941,317 B1 * | 9/2005 | Chamberlin et al. .......... | 1/1 |
| 7,089,228 B2 | 8/2006 | Arnold et al. | |
| 7,644,087 B2 * | 1/2010 | Barkai et al. ............. | 707/770 |
| 2003/0101169 A1 * | 5/2003 | Bhatt et al. .............. | 707/3 |
| 2005/0044064 A1 | 2/2005 | Haase | |
| 2005/0177556 A1 * | 8/2005 | Fang et al. .............. | 707/3 |
| 2005/0209988 A1 | 9/2005 | Cunningham et al. | |
| 2005/0289098 A1 * | 12/2005 | Barsness et al. ............ | 707/1 |
| 2006/0080313 A1 * | 4/2006 | Freire .................... | 707/5 |
| 2006/0167927 A1 | 7/2006 | Edelstein et al. | |
| 2006/0230016 A1 | 10/2006 | Cunningham et al. | |
| 2007/0011653 A1 * | 1/2007 | Fischer et al. ............ | 717/120 |
| 2007/0067274 A1 * | 3/2007 | Han et al. ............... | 707/4 |
| 2010/0011030 A1 * | 1/2010 | Lim et al. ............... | 707/200 |

OTHER PUBLICATIONS

"Counting, Enumerating, and Sampling of Execution Plans in a Cost-Based Query Optimzer"; ACM SIGMOD Record vol. 29, Issue 2 (Jun. 2000); pp. 499-509.

* cited by examiner

*Primary Examiner* — Mohammad Ali
*Assistant Examiner* — Patrick A Darno
(74) *Attorney, Agent, or Firm* — Robert C. Kowert; Meyertons, Hood, Kivlin, Kowert & Goetzel, P.C.

(57) ABSTRACT

A system and method for distributed query processing may compile and optimize query plans for incoming query requests independent of hardware configurations and/or physical locations of data partitions in a distributed storage system (e.g., a data grid). The query plan may be divided into segments, and each segment may be instantiated on a remote query processing node of the distributed system by a query coordinator node according to metadata accessed at runtime by remote sub-query operators in the query plan. The metadata may include an indication of the physical locations of data partitions in the system and may be stored on one or more of the query processing nodes. The remote query processing nodes may execute the query plan segments and return results to the requestor. Cached query plans may be re-executed without recompilation, according to current metadata, even in the event of a node failure or data partition move.

49 Claims, 15 Drawing Sheets

SYSTEM AND METHOD FOR DISTRIBUTED QUERY PROCESSING USING CONFIGURATION-INDEPENDENT QUERY PLANS

BACKGROUND OF THE INVENTION

1. Field of the Invention

This invention relates to computing systems and more specifically to distributed query processing in data storage systems.

2. Description of the Related Art

Database systems managing large amounts of data may distribute and/or replicate that data across two or more machines, often in different locations, for any of a number of reasons, including security issues, disaster prevention and recovery issues, data locality and availability issues, etc. These machines may be configured in any number of ways, including as a shared resource pool, such as in a grid computing architecture.

Some commercially available database systems offer distributed query processing for use on such resource pools. With traditional distributed query processing, a query is divided in local and remote parts. A single query processor builds a query for the local part and uses special interfaces and/or middle-ware to allow the local node to access remote nodes. In such systems, the remote node must be available throughout the processing otherwise the system hangs. Changing a remote node, in these systems, requires a static reconfiguration of the system. Consequently these systems may scale only to a small number of nodes, on the order of four to sixteen.

In distributed query processing, a query submitted by a client using a declarative query language (e.g., XQuery, SQL, OQL, etc.) is transformed into a procedural query execution plan, i.e., a network of relational algebra operators. The query itself specifies only what to retrieve/examine/manipulate, whereas the query execution plan specifies a precise order in which operations are to be applied.

The general workflow in query processing typically involves the following four steps:
- generate a query execution plan (sometimes referred to as compilation)
- instantiate the plan (i.e., allocate all resource needed for execution)
- execute the plan (i.e., process the data)
- release the resources Query plan compilation typically involves both a translation operation (e.g., translating a query from a declarative query language into an internally executable format) and an optimization operation. The query optimizer's choice of an execution plan is not only dependent on the query itself but is strongly influenced by a large number of parameters describing the database and the hardware environment. Modifying these parameters in order to steer the optimizer to select particular plans is difficult in these systems since this may involve anticipating often complex search strategies implemented in the optimizer.

Conventional database systems that offer "remote query capabilities" generate query plans that are always executed locally. These plans may be cut up and plan segments may be identified for execution on remote nodes. However, the segments that are to be executed remotely are removed from the plan and encoded in terms of query language expressions that rely on operators functioning as interfaces to the remote nodes.

Cost-based query optimizers typically consider a large number of candidate execution plans, and select one for execution. The choice of an execution plan is the result of various, interacting factors, such as database and system state, current table statistics, calibration of costing formulas, algorithms to generate alternatives of interest, and heuristics to cope with the combinatorial explosion of the search space.

Query compilation is typically very expensive (in particular, the optimization operation). Therefore, database systems often cache compiled query plans and re-use them if possible. The re-use of these plans is limited by their flexibility. If the plan relies in a stringent way on volatile information, i.e., information that changes between compilation and execution, the plan cannot be re-used, and must be recompiled. For example, in typical distributed query processing systems, query plans are heavily dependent on the location of data on particular nodes. If one or more nodes in the system changes (e.g., if nodes are often added or removed, or if they fail) the cached query plans may be invalidated and may need to be recompiled at significant cost.

SUMMARY

A system and method for distributed query processing may include a plurality of query processing nodes. Each query processing node may include a processor and a memory. The memory may include a data store and program instructions executable by the processor to implement a query processor and a portion of a distributed storage system, such as a distributed database system. In some embodiments, the query processor may be configured to receive a query request and compile a query plan for execution of the query independent of the hardware configuration of the system and independent of the location of data maintained by the distributed storage system.

Compiling the query plan may in some embodiments include transforming the query request from the format in which it was received (e.g., a standard query language) into a query expressed in terms of an algebra used internally by the query processing nodes. Compiling the query plan may also include optimizing the plan independent of the hardware configuration of the system and independent of the location of data maintained by the distributed storage system. In some embodiments, compiling the query plan may include dividing the query plan into a plurality of executable plan segments. Query plans may include various logical and physical operators, user-defined functions, and special remote sub-query operators, in some embodiments.

The query processor may also be configured to instantiate a segment of the query plan on each of one or more query processing nodes, in some embodiments. Determining the node on which each segment is instantiated may be determined at runtime by remote sub-query operators in the query plan. The remote sub-query operators may determine the nodes on which to instantiate the segments of the query plan by accessing metadata that indicates the location of one or more data partitions in the distributed storage system. This metadata may be maintained on one or more of the query processing nodes, in various embodiments.

In some embodiments, a second query processing node may be configured to instantiate a segment of the query plan on another of the query processing nodes, to receive query results from the other query processing node, and to return the query results received from the other query processing node to the query processing node that originally received the query request.

In some embodiments, the query processing node that received the query request (which may be referred to as the Query Coordinator Node, or QCN) may be configured to grant a resource lease to a requestor on whose behalf the query was received once the query plan segments have been instantiated on the remote nodes. The query processing node may also be configured to release the leased resources in response to the requestor relinquishing the resource lease, such as when all results have been returned to the requestor.

The system described herein may also include a front-end server configured to provide additional services to the system. For example, the front-end server may be configured to provide an interface between a client application requesting data and the query processing nodes, a load-balancing service configured to submit requests received on behalf of a client application to one of the query processing nodes, an authentication service to determine ownership of query requests, a query request quota monitoring service, and/or a query request timeout service, in different embodiments.

The system described herein may in some embodiments be implemented as a grid computing system or using any other architectural configuration suitable for implementing the distributed storage system and distributed query processing methods described. For example, in one embodiment, query processing nodes may be grouped in clusters. Each cluster may include a master node for a given data partition of the distributed storage system and one or more other nodes that replicate the given data partition. If the master node for a given data partition fails, the other nodes of the cluster may be configured to elect a new master node for the data partition. Because query plans are compiled and optimized independent of the hardware configuration of the system, a query plan segment targeted for instantiation on the master node may in some embodiments be instantiated on the new master node without the query plan being recompiled.

The methods described herein may in some embodiments be implemented by software instructions computer-executable to implement the functionality described. For example, in some embodiments, the methods may be implemented by program instructions encoded on a computer-readable storage medium, as described herein.

Figure 1:
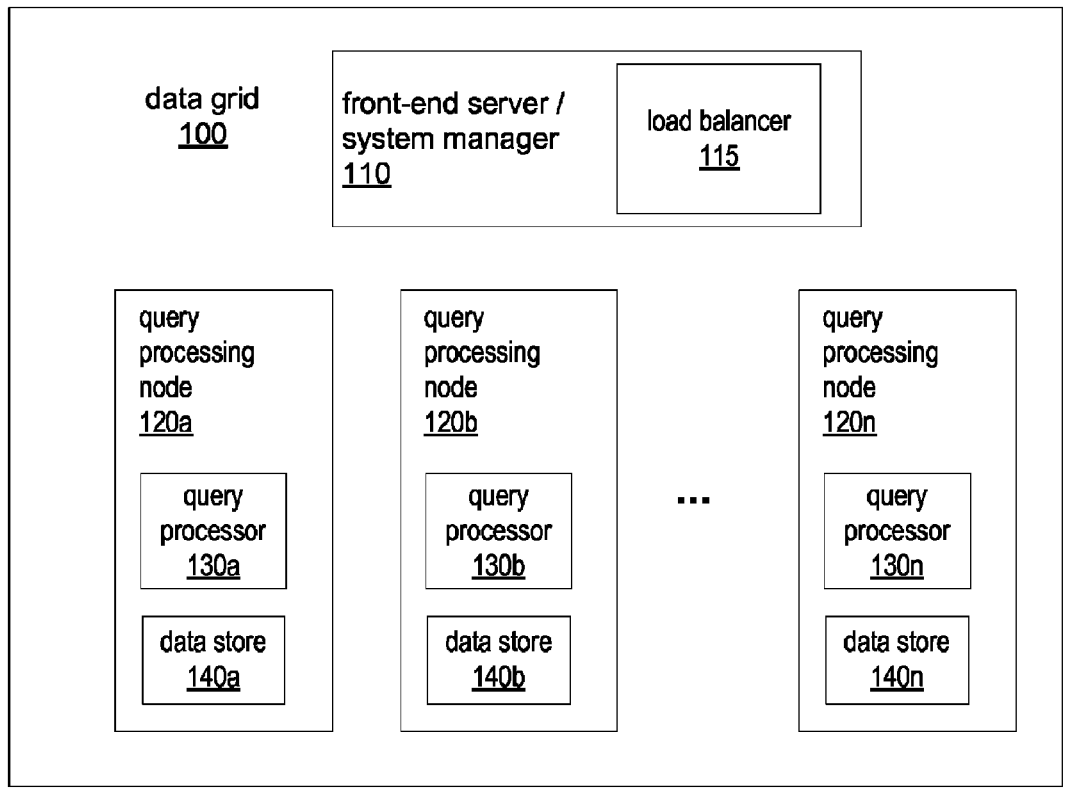
FIG. 1 illustrates a data grid suitable for implementing distributed query processing, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

A system and method for implementing distributed query processing using configuration-independent query plans is disclosed. The system may provide a query processing framework that includes a declarative query language and a query processor comprising a query optimizer and a distributed query execution platform. Query expressions may be parallelized automatically and scheduled over a resource pool according to data locality at runtime. The method may include a query processor performing compilation and optimization of a query execution plan without regard to the partitioning and/or distribution of remote data. As used herein, the terms "optimize" and/or "optimizing" may refer to an operation performed in order to achieve an improved result, such as reduced execution costs or increased resource utilization, whether or not the optimum result is actually achieved. Similarly, the term "optimizer" may refer to a component for performing such an improvement operation, and the term "optimized" may be used to describe the result of such an improvement operation. The method may also include the query processor initiating execution of the query plan, which may involve instantiating portions of the query plan on two or more nodes in a distributed database architecture by determining the nodes on which respective portions of the query will be instantiated at runtime, rather than at compilation time. For example, the nodes on which respective portions of the query plan are to be instantiated may be determined by an execution engine within the query processor dependent on metadata accessed by the execution engine at runtime.

In some embodiments, the system may include a shared resource pool on which data is distributed, such as a grid computing architecture. Grid computing involves scheduling applications by dynamically allocating resources from a shared pool according to the demands of the application. This grid technology may aim at maximizing the utilization of a given resource pool. In some embodiments, as in a typical grid infrastructure, there may be no dedicated or reserved resources. Therefore, quota and monitoring systems may be used in some embodiments to prevent overloading of the system and establish fairness or proper priorities of the scheduling. For example, in some embodiments, a quota system may be imposed to limit allocation to maintain the system load within manageable bounds. Client specific quotas may also result in a high degree of system responsiveness, even as individual clients max out their resource allowance.

In some embodiments, a resource pool may be implemented as a collection of clusters of nodes. The nodes in each cluster may be identical with respect to the data they store. In some embodiments, each cluster may host a set of data partitions. For each data partition, one node in each cluster may be the master node that accepts all traffic for the partition (both reads and writes, for example). The other nodes in the cluster may replicate the data maintained by the master node. In some embodiments, the distributed database may be a versioned store, i.e., each modification of stored data may create a new version of that data. In such embodiments, handling of versions (e.g., detecting conflicts, triggering reconciliation, etc.) may be dealt with at a query layer. Note that in some embodiments, replication and data partitioning functions are not mixed. In other words, replication is implemented separately for each data partition, rather than for the distributed database as a whole. In such embodiments, the entire distributed database may not be replicated on any one node, and each data partition may be replicated on particular other nodes independent of where other data partitions are replicated.

In some embodiments, all nodes in the system may be symmetric in functionality, i.e., any node may answer a query. The routing of incoming query requests may be managed by a load balancing service, which may be a component of a front-end service layer. A front-end service layer may also include a web-based user interface or another user interface mechanism through which clients may query the distributed database.

The system and methods described herein may facilitate a high degree of scalability and availability for a distributed database system. The granularity of scaling, for example, may be a single node. In other words, adding a single node may add both storage and computing capacity proportionally to the overall system. Within pools of clusters, the scalability may be approximately linear.

The system and methods described herein may in some embodiments be implemented as a web-based service, while in others they may be accessible using another user interface mechanism or they may not be accessible to or from nodes outside of the system architecture. The system may in some embodiments support standardized APIs, such as those conforming to SOAP and/or REST standards, and may not require clients to link to any special libraries in order to adopt it.

The system and methods described herein may facilitate highly efficient processing of a variety of query types in a distributed database system, such as a grid computing system. These query types include, but are not limited to:
  primary key lookup—in which a data fragment is retrieved by the client application given its primary key value
  needle-in-a-haystack query—in which an entire data set must be searched (i.e., predicates must be evaluated over every data fragment) and the result set comprises only a few elements
  queries having secondary index support—these may be similar to needle-in-a-haystack queries, but instead of scanning the entire data set, a secondary index may be used to identify qualifying data
  workflow processing—in which self-contained queries may process a large value of data (e.g., read, modify, and write data)

Note that, as used herein, the term "primary key" may refer to an identifier that uniquely references a database entry (e.g., a database row) containing information of a particular type (such as a name, product code, phone number, etc.) or to an identifier that is most commonly used to reference a database entry of a particular type. In other words, a primary key may in some embodiments serve as a primary index for addressing entries in a database. The set of queries which make up the majority of the default workload submitted by client applications in a typical distributed database system may be small and may consist of substantially similar queries (e.g., queries that do not differ in structure, but only in one or more parameters). For example, primary key lookup queries may differ only in the value of the query parameter specifying the key. Plan caching may in some embodiments be highly effective for such a query workload. In some embodiments, query plans for common query types may be generated as parameterized query plans and may be cached for later use. Cached query plans may be executed without recompilation, according to current parameter values.

Data Grid for Distributed Query Processing

The system described herein for performing distributed query processing may in some embodiments be an extensible and highly available data processing platform that combines data storage and grid computing capabilities. FIG. 1 illustrates one such system, a data grid 100, according to one embodiment. In this example, data grid 100 includes a front-end server 110, which may include a load balancer 115. The front-end server may in some embodiments be configured to receive user queries and to submit them to any node in data grid 100. In some embodiments, the load balancer may be utilized to determine to which nodes each user query should be submitted. The data grid may also include any number of query processing nodes 120. While the query processing nodes 120a-120n are illustrated in FIG. 1 as being stand-alone nodes, in other embodiments query processing nodes 120 may be configured as a clusters of nodes, as described above.

In keeping with common design principles of distributed systems, the query processing architecture for data grid 100 may be fully symmetric across all nodes, i.e., the same software stack may be deployed on all nodes that host a portion of a distributed data storage system and/or shared services. As illustrated in FIG. 1, each query processing node may include a query processor 130 and a data store 140. The query processor may be a modular, self-contained component of this stack with one query processor instance per node. In some embodiments, every query processor instance can accept requests, parse, optimize and execute them. As part of the processing, a query processor instance may delegate sub-requests to other instances on remote nodes.

Query processor 130 may include a query server process configured to control the execution of the methods described herein. For example, a query server process may implement functionality in the areas of process management, manageability and supportability. Other processes within query processor 130 may be configured to receive user queries, translate the user queries into executable query plans, optimize the query plans, instantiate portions of the query plans on one or more other query processing nodes and return query results to the client application via front-end server 110. For example, query processor 130 may include functional components for performing the following groups of functions:
  algebraization (which may encompass request parsing and transformation to the target algebra)
  optimization of the initial algebraic expression
  execution in a distributed network of processes The processes that make up query processor 130 are described in more detail below.

Data store 140 may in some embodiments be configured to maintain data as part of a distributed database system, and this data may be replicated on one or more other query processing nodes 120, as described herein. Data store 140 may also be configured to store metadata information, such as that used to determine target nodes on which query plan segments are to be instantiated, in some embodiments.

As noted above, various front-end tasks such as load-balancing, authorization and/or authentication, or connection management may in some embodiments be performed outside the query processors. Depending on the configuration of the system these front-end tasks may be concentrated on a dedicated subset of host nodes, such as front-end server 110.

In some embodiments, the system described herein may provide for a distributed database system of significantly larger scale than conventional database systems. For example, rather than supporting a maximum of sixteen nodes, as in some conventional database systems, the system described herein may support hundreds or even thousands of nodes. Also unlike conventional database systems, the system described herein may be run on commodity hardware with high failure rates, i.e., systems in which individual host nodes are often unavailable (either temporarily or permanently). In failure cases, the system may in some embodiments utilize replica backup hosts, but may not need to recompile query plans in response to the failures. The system may also be able to deal transparently with maintenance tasks such as repartitioning data, which may render individual host nodes temporarily unavailable.

Figure 2:
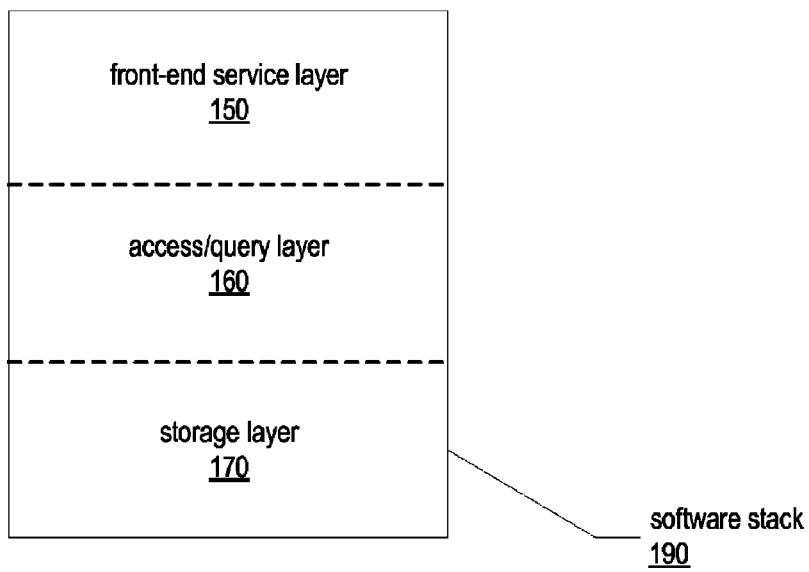
FIG. 2 illustrates a software stack for implementing distributed query processing, according to one embodiment.

As noted above, the query processing architecture described herein may be fully symmetric across all nodes, i.e., the same software stack may be deployed on all host nodes. FIG. 2 illustrates a software stack 190 suitable for implementing distributed query processing, according to one embodiment. In this example, software stack 190 includes three layers, a front-end service layer 150, an access/query layer 160, and a storage layer 170, although additional layers may be included in other embodiments. In the example illustrated in FIG. 2, front-end service layer 150 may include a user interface and/or various management services including, but not limited to, a parser/translator for incoming query requests, a load balancing process, a connection service, and one or more security-related components. Various front-end services are described in more detail below.

Access/query layer 160, in this example, may include a query processor, such as query processor 130 of FIG. 1, including a query server process and other functional components, such as those described herein. In some embodiments, access/query layer 160 may also include metadata storage and/or means to access this metadata. In other embodiments, metadata storage may be included in storage layer 170 of each software stack 190. Storage layer 170 may include both data storage for a distributed database and means to access and/or manage a portion of the distributed database, as described in more detail below.

In the system described herein, information about what data is located on what host node(s) may be stored as metadata and used at runtime by the query processor to determine on what nodes to distribute portions of a query plan. As noted above, this metadata may in some embodiments be highly volatile due to the size of the hardware infrastructure and any failures or maintenance operations that may occur during operation of the system. The system described herein may generate query plans independent of this metadata, and may access it only at runtime. Thus, in some embodiments, query plan caching may be very effective even with a high incidence of failures and maintenance operations.

In various embodiments, metadata indicating what data is located on what host node(s) may be stored locally on each host node. This metadata may be updated locally in some embodiments, such as in response to a hardware configuration change, the election of a new master node for a cluster, or the move of a data partition from the host node to another host node. In some embodiments, this metadata may be updated globally, using information received from one or more other host nodes in response to such changes. In various embodiments, the metadata stored on each node of the fleet may or may not be synchronized with the metadata stored on other nodes. In some embodiments, metadata may be synchronized on the nodes of a particular cluster or on nodes storing data for a same data partition.

Partitioning

In some embodiments, partitioning of data across the resource pool may involve breaking down a large fleet of machines (nodes) into sites. A site may be an individual host node or a cluster of host nodes, as described above. In some embodiments, a site may be the component granularity at which the query processor interacts with the storage layer.

In some embodiments, data is organized as collections that are partitioned across a number of sites. The algorithms underlying the partitioning scheme may in some embodiments not be accessible to the query processor. However, the actual partitioning (e.g., the distribution of ranges of a primary key to various sites) may be exposed to the query processor in the form of a partitioning function. For example, a partitioning function may map given keys for a collection of data to one or more partition identifiers:

partition (<collection>, <key>)->Partitioned partitions (<collection>)->ListofPartitionIDs In the example above, each collection of data may have a partitioning function associated with it. In some embodiments, the particular partitioning function may be exposed as a built-in function and may therefore be integrated in query plans like any other scalar or table-valued function.

In some embodiments, it may be irrelevant to the query processor what mechanisms are deployed to manage host nodes, partition data, or re-partition data as part of management of the resource pool, since the query processor accesses data strictly according to the information provided by the partitioning function. Both user data and system data (e.g., data exposed through system tables) may be transparently partitioned in the system. In some embodiments, the partitioning key for system data may be an identifier of the scope of the system table. For example, system information on a cluster basis may be partitioned by cluster identifiers, information on a per host basis may be partitioned by host identifiers, etc.

The system described herein may allow for dynamic repartitioning without incurring any system down time. This non-static partitioning assignment may in some embodiments result in extremely efficient resource utilization and may also enable system information to be integrated at different levels of the architecture using regular query processing. System information concerning individual host nodes may not be conceptually distinguishable from user data (i.e., the same query concepts apply). Instead, system information may differ only in the granularity of partitioning. For example, in the case of per-host information, the IP address of the node to which the information applies may serve as the partitioning key. The query processor may in some embodiments address this aspect of the system by providing a framework for parameterization of any part of a query plan. This may allow a part of a query plan to be shipped to any host node in the fleet. In other words, parameterization may allow the system described herein to implement late binding of the query plan to a data source.

Transactions

The system described herein may or may not expose the concept of a transaction to client applications. In other words, in some embodiments it may not support a means for a client application to specify that a sequence of operations be treated atomically with respect to concurrent client operations. Internally, however, the system may utilize transactions on a per-site basis. For example, data access operations such as table scans, index accesses, etc., may be part of a transaction (i.e., the associated read operators may access local data transactionally). In some embodiments, the storage layer may provide deadlock detection and resolution within one site. For example, once a deadlock is detected, a victim may be chosen and the associated process may be killed, triggering a cleanup of the remainder of the query. The system may in some embodiments implement distributed transactions that are used internally for certain types of data modifications (e.g., metadata modifications). Such distributed transactions may only be used in situations in which their impact is suitably limited. In different embodiments, transactions may or may not be used in conjunction with (and may or may not be supported by) the system and methods described herein for distributed query processing.

Distributed Query Processing Method

Figure 3:
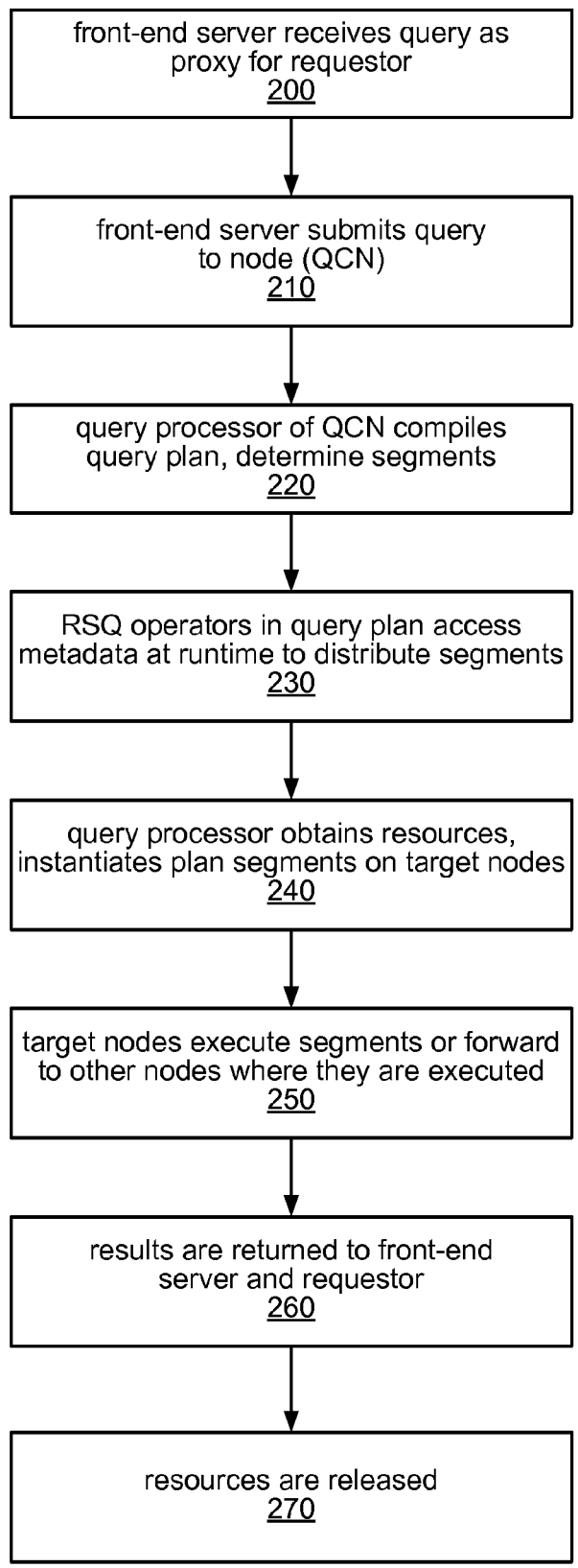
FIG. 3 illustrates one embodiment of a method for distributed query processing.

One embodiment of method for performing distributed query processing is illustrated in FIG. 3. In this example, a front-end server, such as front-end server 110 of FIG. 1, may receive a query as a proxy for a requesting client, as in 200. For example, the query may in some embodiments be provided in a declarative query language (e.g., SQL, XQuery). The front-end server, which may include a load-balancing service, may submit the query to one of a fleet of nodes of a distributed database system, as in 210. This node may be designated as the query coordinator node (QCN) for the query request. In some embodiments, the set of coordinator nodes may be configurable, while in others any node may serve as a coordinator. In one embodiment, a request may consist of an XQuery statement, and may include one or more built-in functions and/or user-defined functions, including side-effecting functions.

In some embodiments, the front-end server may also perform authentication to establish an accurate determination of query ownership. Such authentication may in some embodiments be used for security reasons as well as to establish proper quota accounting and/or billing.

The method may include the query coordinator node compiling a query plan, as in 220. As described above, compiling a query plan may in some embodiments include translating the query request into the target algebra and optimizing the query without regard to the physical configuration and/or partitioning of the distributed database.

Figure 4:
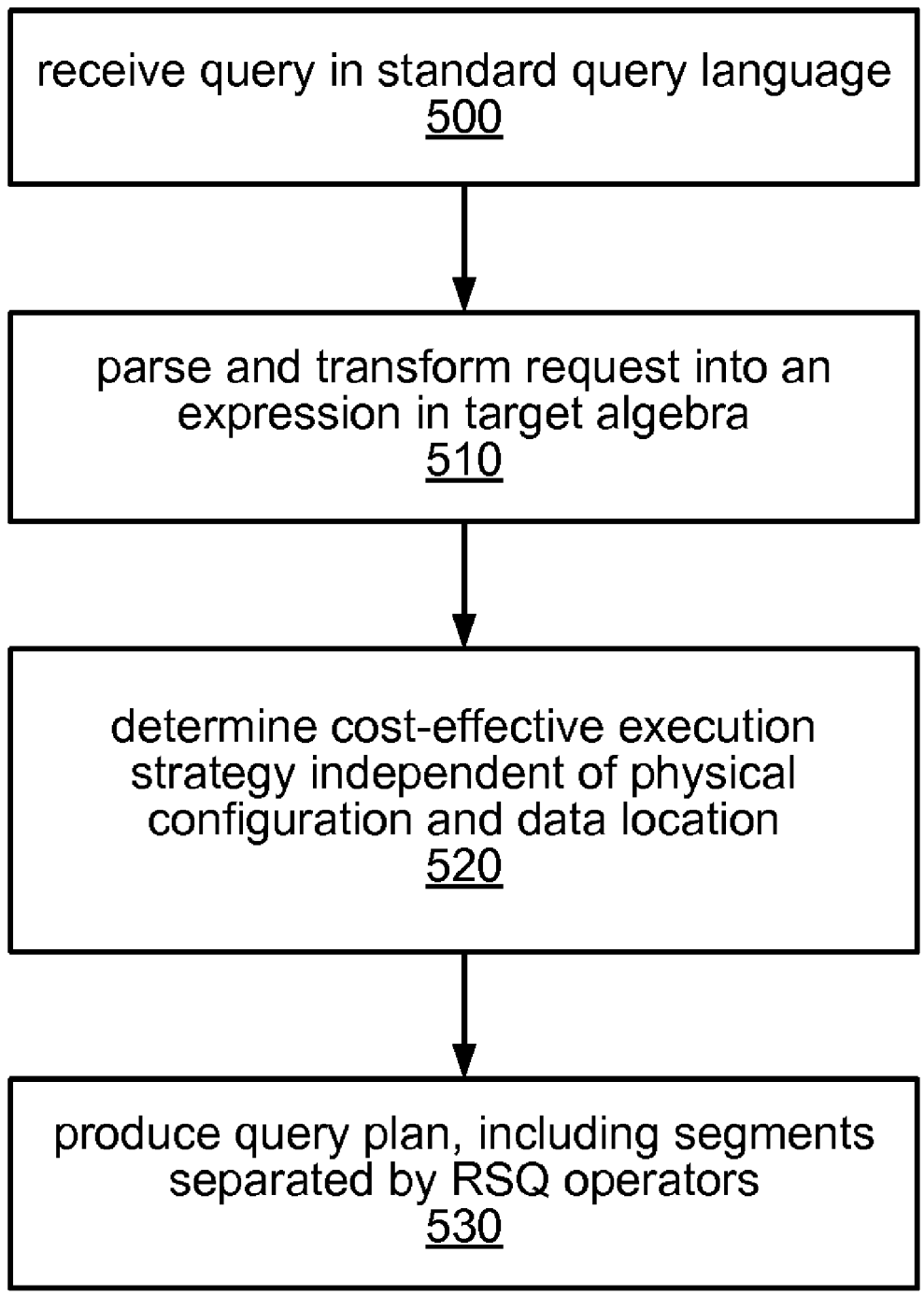
FIG. 4 illustrates one embodiment of a method for generating query plans for distributed query processing.

The system described herein may utilize query plans that comprise the entire query. In other words, it may not differentiate between local and remote query plans. The query plan generated by the query coordinator may consist of segments that need to be executed on different nodes according to the placing of the data partitions these segments access. These segments may be delineated in the query plan by the use of special remote sub-query operators, which are described in more detail below. The query coordinator may determine the segments of the query plan, but these segments may not be associated with a particular query processing node until runtime. One method for generating query plans is illustrated in FIG. 4 and is described in more detail below.

The method illustrated in FIG. 3 may include the execution engine initiating execution of the query plan. This may include remote sub-query operators in the query plan accessing metadata at runtime to determine on which nodes to distribute the segments of the query plan, as in 230. The remote sub-query operators access the metadata at run time and invoke execution of each remote query segment dependent on the metadata available at the time. The metadata may in some embodiments include information indicating, but is not limited to, the following use cases:

the data corresponding to a given access key has been moved (e.g., due to repartitioning) and hence, the remote query segment needs to be executed on a different node the node which had the primary copy of the data is down, thus the remote query segment needs to be executed on a replica node the data has been repartitioned into a different number of partitions (e.g., instead of using N different remote query segments, 2*N remote query segments are needed)

Using the system and methods described herein, all of the above examples may be handled using the query plan as compiled (i.e., none of the events described above require a recompilation of the plan.)

As illustrated in FIG. 3, the method may include the query processor of the QCN obtaining the resources needed to execute the query plan and instantiating the plan on the target nodes, as in 240. The method may also include the target nodes executing segments of the query plan, as in 250. If one of the target nodes is not able to execute a received query plan segment (e.g., if the data partition of interest has moved since the last metadata update on the QCN), the target node may in some embodiments forward the query plan segment to another node (e.g., according to more recent metadata stored on the initial target host node indicating where the data partition moved).

As each of the target nodes completes execution of its query plan segment, results may be returned to the front-end server and the requestor (e.g., the requesting client application) as in 260. Once the requestor has received the results (and/or any error messages indicating a query failure), the method may include the requestor releasing the resources, as in 270.

The method illustrated in FIG. 3 is further described by way of an example query life-cycle, depicted in FIGS. 8A-8E and described in detail below. In the example illustrated in FIGS. 8A-8E, the operations illustrated in FIG. 3 are described as they apply to various nodes of a distributed query system.

Execution Engine

As noted above, the output of the algebraization/optimization phase is a query plan, which is a detailed description of a strategy for executing a query. The query plan may include the description of a network of processes, each of which represents an algebra operator needed to read, process, manipulate or filter the target data. The execution engine component of the query processor (i.e., the query processor of the QCN) may instantiate this abstract description on one or more nodes according to the query plan. Once the plan is instantiated, the external requestor may in some embodiments submit requests for output data and these requests may be propagated to the operators for processing. Notably, the operators may generate their output on-demand only, thereby avoiding unnecessary processing if the query is terminated prematurely. For example, a number of standard queries may terminate before all possible results are returned (e.g., a query for finding the top N results).

The execution engine component may in some embodiments implement:

an extensible library of implementations of relational algebra operators the framework for the instantiation of a network of operators, which may include facilities for distributing processes across a potentially large number of host nodes, as well as means to monitor and control the progress of the execution a versioned communication protocol between operators/operators and between nodes/nodes that ensures interoperability of components of different software versions, which may enable rolling upgrades of the system without partial or complete shutdown As noted above, the execution engine may be extensible by the addition of new operators. The addition of new operators to the library may in some embodiments provide additional functionality regarding the expressiveness of queries. In some embodiments, maintaining narrow, well-defined APIs ensures easy and flexible composition of operators. The system disclosed herein may include as few as a dozen operators to service its primary use cases, or may be extended to include any number of operators.

The execution engine of the query processor described herein may be optimized for:

distributed query execution, including spawning remote query segments at run time as sub-queries, and/or fault-tolerance to better allow for (1) the distributed nature of a query in the system and (2) higher availability requirements including live upgrades Generating Query Plans One embodiment of a method for generating query plans for distributed query processing (sometimes referred to as query plan compilation) is illustrated in FIG. 4. In some embodiments, all of the operations illustrated in FIG. 4 may be performed by a query processor on a query coordinator node (i.e., by a software component of an access/query layer, such as access/query layer 160 illustrated in FIG. 2). As described above, the system described herein may in some embodiments provide client applications with an XQuery interface or an interface supporting another standard query language. In such embodiments, clients may interface with the system strictly via the query language but no other APIs. For example, they may communicate requests or batches of requests to the system using a protocol such as SOAP or REST, which may be used to wrap both requests and replies accordingly.

As illustrated in FIG. 4, a query coordinator node (QCN) may receive a query in a standard query language, as in 500. Implementing a declarative query language may in some embodiments enable the query processing framework to apply a variety of optimization techniques.

In one embodiment, the framework may implement a subset of XQuery. The exact extent of this subset may in some embodiments be driven by the requirements of the system's customers. The subset may include a minimal kernel of the language, and/or additional constructs may be enabled as requirements necessitate. In some embodiments, the supported set of language constructs may be grown carefully and within the limits of the standard without incurring potentially high implementation costs up-front. In particular, XQuery's user-defined functions may allow the system to provide features through built-in functions (e.g., stored procedures) which would require more elaborate language support had they been formulated in XQuery's native primitives. For example, more complex processing of versioning XML fragments may be hidden from client applications by providing a simple built-in (e.g., a special "write" function). Other functionality that may in some embodiments be provided through built-ins may include a special "get" function and/or a special "path" function, for example.

While the system described herein may support a standard query language (e.g., XQuery) as an application interface on the outside, internally it may use an algebraic model to express and represent data access and manipulation operations, in some embodiments. Therefore, as illustrated in 510, incoming requests (i.e., query statements) may be translated into the corresponding algebraic terms. In such embodiments, the query processor may be considered data model or query language agnostic. The strict separation of externally used query languages and/or data models from the internally used concepts may in some embodiments provide significant advantages for the design of the system. These may include:

providing Physical Data Independence (PDI) (i.e., components in the query processor may be redesigned, exchanged, etc., without affecting the semantics of the external APIs).

enabling using a richer internal model that may capture additional information and integrate well with the programming language in which the query processor is written.

providing additional optimization potential, including re-ordering of operations and automatic parallelization.

In such embodiments, the front-end API and/or data model may be exchanged without having to redesign the underlying query processor. Instead, it may be possible to add support for additional query languages and/or data models (e.g., SQL, etc.) while re-using the underlying query processor. For example, in one embodiment, parsing and/or translation of an incoming query request may be performed on a front-end server, such as front-end server 110 illustrated in FIG. 1, by a software component of a front-end service layer, such as front-end service layer 150, illustrated in FIG. 2, rather than being performed by the query processor (which may be a software component of access/query layer, such as access/query layer 160 of FIG. 2). In such embodiments, the query processor may not need to be redesigned to support changes in query languages and/or data models. Additional operations performed as part of query plan generation (e.g., algebraization, optimization, segmentation, etc.) may be performed by the query processor.

Translating incoming requests to the target algebra, as in 510, may sometimes be referred to as "algebraization." Algebraization may include parsing and binding of an incoming request, in some embodiments. Binding may involve name resolution for all objects referenced in the query such as domains, collections, views or user-defined functions (UDFs). The parsed expression may be transformed into an expression in the target algebra, in some embodiments. The result of this transformation may be a canonical representation of the original query that is correct (i.e., the algebraic expression may be semantically equivalent to the input response) but may typically be sub-optimal. The algebraic expression output from this translation may be referred to as a bound expression.

As illustrated in FIG. 4, the method may include determining the most cost-effective execution strategy for a query, as in 520. This operation, which may be referred to as optimization, typically may include determining the most cost-effective execution strategy for the bound expression taking resources availability and latency requirements into account. However, in the system described herein, optimization may be performed independent of the physical configuration and mapping of data to physical locations. Various known and/or contemplated methods for performing query plan optimization may be applied to the system and methods described herein, but any dependence of these methods on the physical configuration and mapping of data in the system may be ignored or discarded. This may result in a simpler and/or more efficient optimization technique. Several examples of query plan optimizations are described below.

For any incoming query, there may exist any number of execution plans to consider that would achieve the same result, but a particular plan may be more cost-effective than one or more of the others. For example, an incoming query may include a request to "find all employees in department 123 who earn more than $80,000." If there are very few people working in a department on average, looking for employees in department 123 first may be more efficient than searching for top earners first. In such cases, once all employees of department 123 have been determined, the query may filter the results based on their income. Conversely, if there are very few people whose salary exceeds $80,000, looking for the top-earners first and then filtering the results for their affiliation may be more cost-effective.

The decision about which plan to prefer may be made based on cost models and statistics that try to estimate the effort needed to execute one alternative vs. the other. The underlying problem of finding the most cost-effective execution plan (i.e., finding the most efficient order in which to execute operations) has been studied in detail in the literature. Determining the optimal execution order may require the enumeration of all possible orders. The number of alternatives may increase exponentially with the size of the query due to the nature of the problem. In some embodiments, the system and methods described herein may simplify the optimization process. For example, in some embodiments, the optimizer may not need to distinguish between local or remote queries when determining the order in which to execute operations or the points at which to insert the remote sub-query operator. In some embodiments, the query optimizer may not need to maintain metadata for data placement. This metadata may instead be accessed only at runtime. Therefore, in some embodiments, the query optimization algorithm utilized in the system described herein may execute faster than optimization algorithms of conventional distributed database systems, since it may not have to take into account where data is located.

As illustrated in FIG. 4, the method for generating a query plan may include producing a plan that includes segments of the query plan separated by remote sub-query operators (RSQs), as in 530. In some embodiments, the optimizer may not need to distinguish between local or remote queries when determining the points at which to insert the remote sub-query operator.

In general, the methods may employ one of two different basic principles in deciding how to partition a query plan into these segments. One involves horizontal data partitioning. In such cases, a plan component may be replicated (with slight modifications, such as a change in one or more parameter values) and applied to different partitions of the query. The results of the individual plan components may then be combined. Another basic principle that may be applied involves partitioning plan components according to groups of operators. In such cases, a query plan may be carved up into smaller parts that are then assigned to different sites.

The method may include the query optimizer making a trade-off between these two partitioning principles according to a cost model, and may in some embodiments generate a hybrid plan. In such a hybrid plan, a potentially significant amount of work may be distributed to exploit data locality by duplicating sub-plans, then all intermediate result may be collected and processed according to the remaining operations centrally.

The integration of distributed query processing concepts into a typical optimizer may be further illustrated by introducing a logical abstraction of the un-partitioned/non-distributed data source in the form of a logical access operator, and an expansion rule which converts the logical access into a plan segment consisting of conventional database operators and the new remote sub-query operator. The initial abstraction as one logical operator may be used as a convenience and may eliminate the need to distinguish between partitioned and non-partitioned data sources before optimization. These concepts are described in more detail below.

The system described herein may, in some embodiments, implement algebraic operators similar to those used in conventional database systems. For example, the system may implement logical operators (e.g., operators that define the characteristics of their output in terms of the input set). These operators may process individual elements of the input set in isolation (e.g., streaming or pipeline operators), or may compute aggregate values requiring several or all elements of the input set to be taken into account (e.g., blocking or aggregating operators). These operators typically do not refer to physical structures such as indexes, etc., and thus are generally used only when parsing queries and applying logical transformations. Examples of logical operators implemented in the system may include joins, semi-joins, selection, etc.

The system may also include algorithms that implement logical operators. These algorithms may be referred to as physical operators. These operators may imply a processing order on their input sets as well as their output sets, and may be described concisely by simple finite state machines. In addition to these types of operators, the system described herein may also add the special remote sub-query operators to the set. Integrating these new operators into the query processing workflow may in some embodiments require only a few changes during optimization and may require no special treatment during execution. Examples of physical operators implemented in the system may include hash-joins, merge-joins, filters, bloom-filters, etc.

FIGS. 5A-5D illustrate these concepts using an example query, according to one embodiment. In this example, a query may be submitted by a client application in order to determine all catalog items manufactured by a particular vendor called vendor ABC. The query may be submitted in valid XPath/XQuery syntax as follows:

collection("catalog.xml")/data/item[@mfc="ABC"]

This query can be translated into a canonical (not-optimized) form as:
1. Read all data from source "catalog.xml"
2. For every unit of data check if the expression/data/item [@mfc="ABC"] holds This query includes evaluating each entry in the data set (in this case, "catalog.xml") against three conditions: (1) that the entry contains an element "item," (2) that this element has an attribute called "mfg," and (3) that the value of the attribute is "ABC." The query operators and their ordering may be commonly represented as a Directed Acyclic Graph (or DAG), such as that illustrated in FIGS. 5A-5D. In the initial tree illustrated in FIG. 5A, the dataflow is bottom-up. In other words, access ("catalog.xml") reads and outputs all data pertaining to the catalog.xml collection.

Figure 5A:
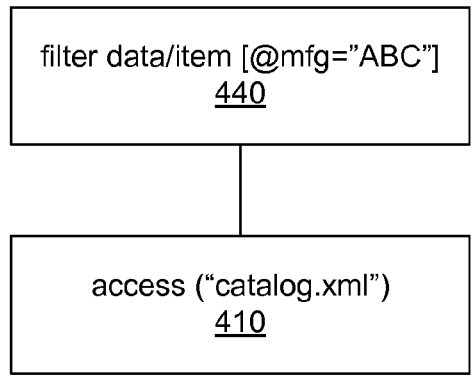
FIGS. 5A-5D illustrate the generation of a query plan, according to one embodiment.

In this example, each operator in the graph corresponds to a logical operation. Logical operations are abstract units and it is the optimizer's task to find implementations for them. In FIG. 5A, the access operator 410 represents the abstract concept of "accessing all data that belongs logically to this collection," but does not make any assumptions about the node on which the data is located nor how to determine this information. The filter operation 440 then filters the data belonging to the collection catalog.xml to find those entries that meet the conditions of the query.

Figure 5B:
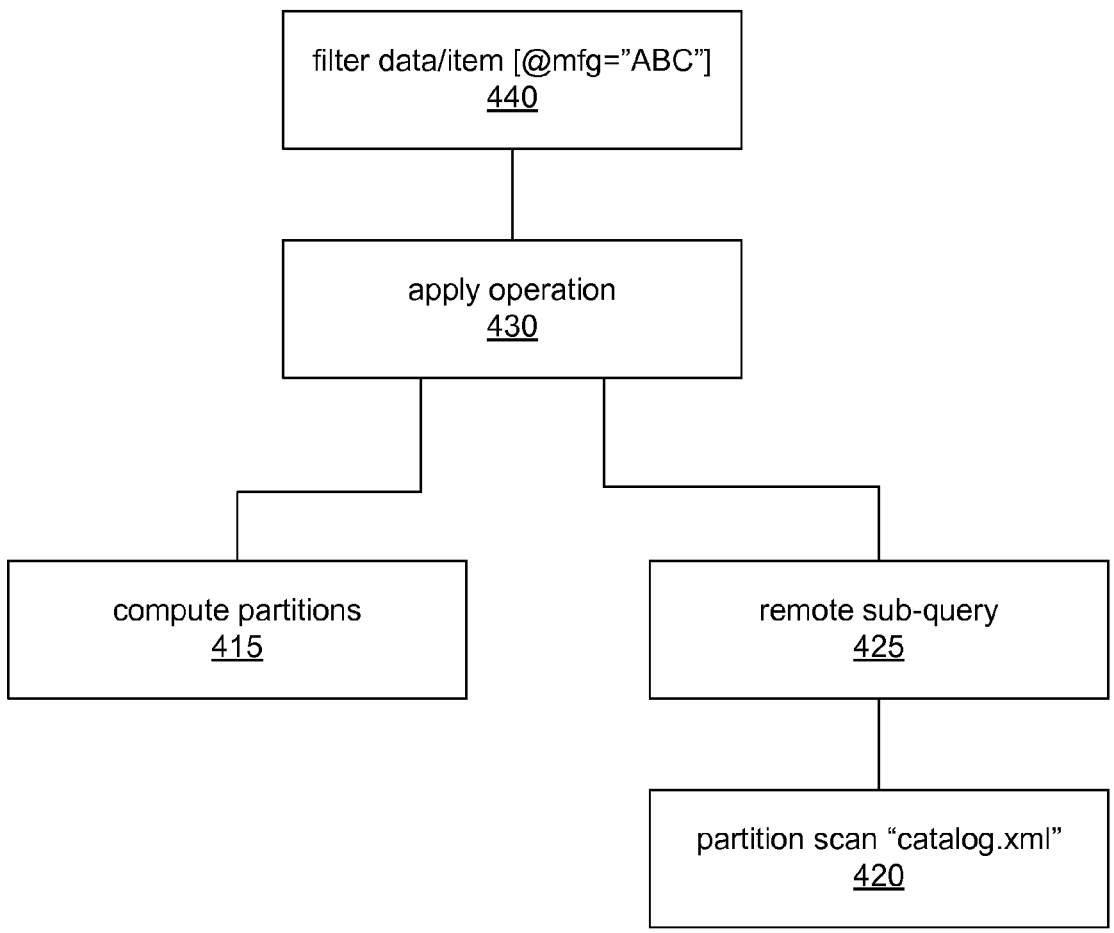

In this example, as part of the optimization process, a simple transformation may be made to the initial query plan. In this case, the access operator may be replaced with an equivalent yet more elaborate plan segment, as in FIG. 5B. FIG. 5B illustrates a re-write of the access operator to a complex apply operation 430. In this example, the apply operation includes a compute partitions operator (at 415), a partition scan operator (at 420), and a remote sub-query operator (at 425). The compute partitions operator 415 determines (at run-time) the partitions on which "catalog.xml" resides. The apply operator executes its right sub-tree according to this information. In this example, the remote sub-query operator 425 may instantiate the partition scan 420 on one or more remote nodes according to this information. Other substitution strategies are contemplated and may be applied to an initial query plan during optimization in other embodiments.

Figure 5C:
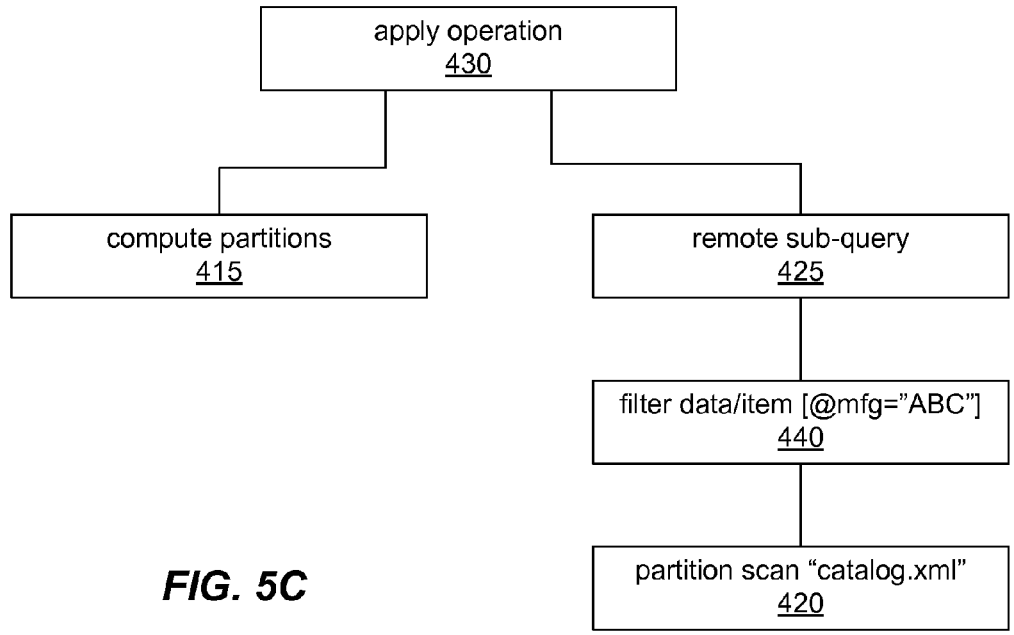

In the example illustrated in FIGS. 5A-5D, after the substitution described above, regular optimization rules may be applied. For example, in some embodiments, the filter evaluation 440 may be moved down below the remote sub-query operation 425. This is illustrated in FIG. 5C. Using the Directed Acyclic Graph format illustrated, any operation below a remote sub-query may be executed locally on the target node before results are returned to a query coordinator node. Depending on cost estimates for various operations, the optimizer may in some embodiments attempt to move any operation that may be performed on a remote node to the remote node, if the cost estimate indicates that it will reduce the overall cost of executing the query. Moving filter operations, as the one shown in the example illustrated in FIG. 5C, may in some embodiments reduce overall query execution costs dramatically.

In general, not all operations may be moved below the remote sub-query and hence executed on the remote site. In particular, operators that aggregate data from different nodes may in some embodiments need to be executed centrally and all data may need to be moved to this site for aggregation. The distinction between operations that may or may not be moved below the remote sub-query may be made on a case-by-case basis, according to various embodiments.

Figure 5D:
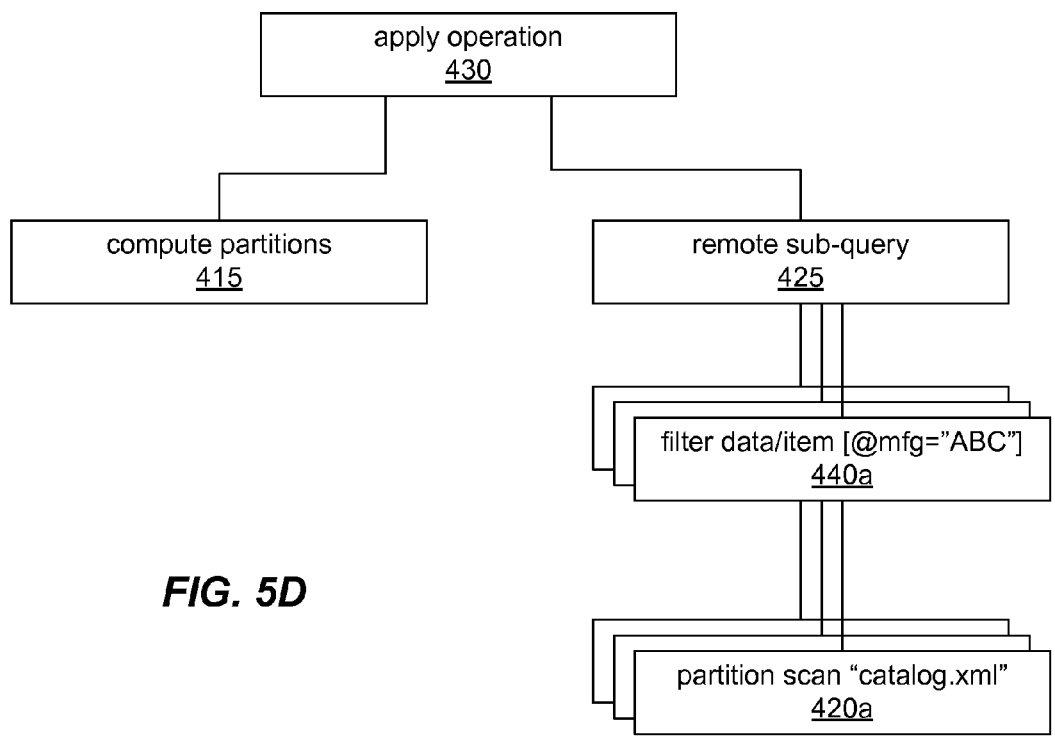

In the example illustrated by FIGS. 5A-5D, the final query plan for the original example query may be expanded during run-time to handle each segment of the query plan. As illustrated in FIG. 5D, the complete plan may include a plurality of partition scans 420 and filter operations 440 executing on remote nodes.

Logical vs. Physical Query Plans

Logical query plans may be made up of logical operators, as described above. They may represent a strictly functional model in which every operator outputs a set, called an intermediate result. In logical query plans, no order of evaluation of operators may be implied unless they are directly or transitively connected by a parent-child relationship. In such cases, children may be evaluated before their parents can be evaluated.

Figure 6A:
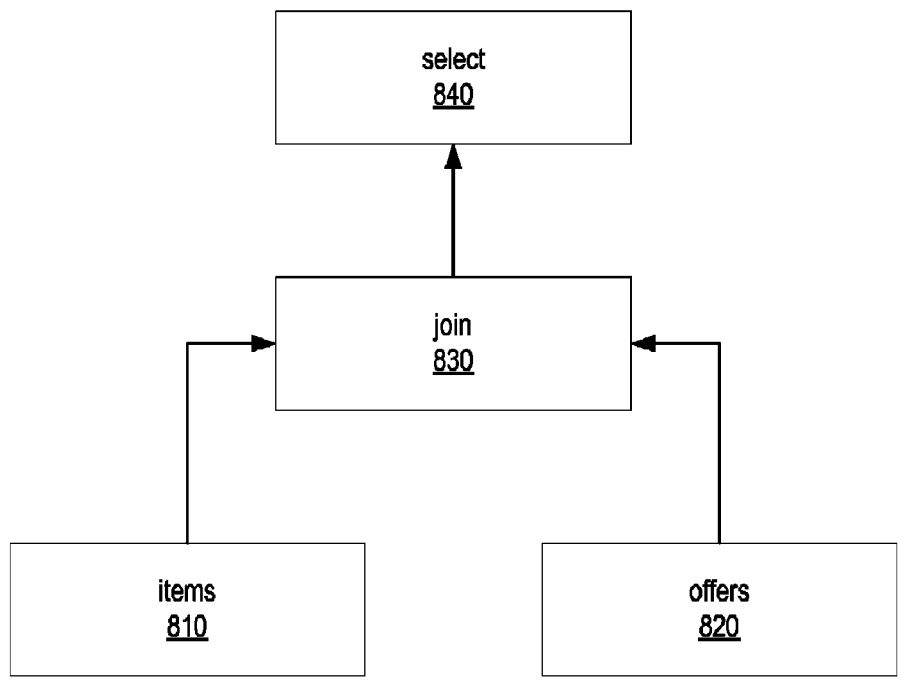
FIGS. 6A and 6B illustrate a logical and a physical query plan, respectively, according to one embodiment.

Logical query plans may define properties of the intermediate results, including information about the structure of the data (e.g., schema information, constraints, keys). A logical query plan may in some embodiments be site-agnostic, i.e., while the plan may take data partitioning into account, it may be unaware of site boundaries for the partitions and/or inter-site communication. Logical query plans may be the basis for transformation-based query optimization, as logical transformations may exploit algebraic properties of the plan (e.g., join-join associativity, join-aggregate permutations, etc.). An example of a logical query plan is illustrated in FIG. 6A, according to one embodiment. In this example, the logical plan consists of multi-set-based logical operators. Multi-set properties may reflect algebraic concepts only (e.g., size of set, etc.). In the example illustrated in FIG. 6A, operations on two sets ("items" and "offers") may be performed, as shown at 810 and 820. The intermediate results of these operations may be joined, shown at 830, and then results may be selected from the joined intermediate results.

Physical query plans may in some embodiments represent implementations of logical plans. In physical query plans, logical operators may be replaced by iterators, each of which implements an operator. In various embodiments, there may not be a one-to-one replacement of logical operators with physical ones, as replacement may depend on the characteristics of intermediate results. Unlike logical plans, physical plans may distinctly define the order in which operators are evaluated. For example, iterators may define the order in which their children are evaluated in order to achieve certain characteristics. Physical query plans may be actual programs and may define their intermediate results by extending their properties to reflect physical properties (e.g., sort orders, disaster protection and/or recovery properties, or deadlock prevention information).

Figure 6B:
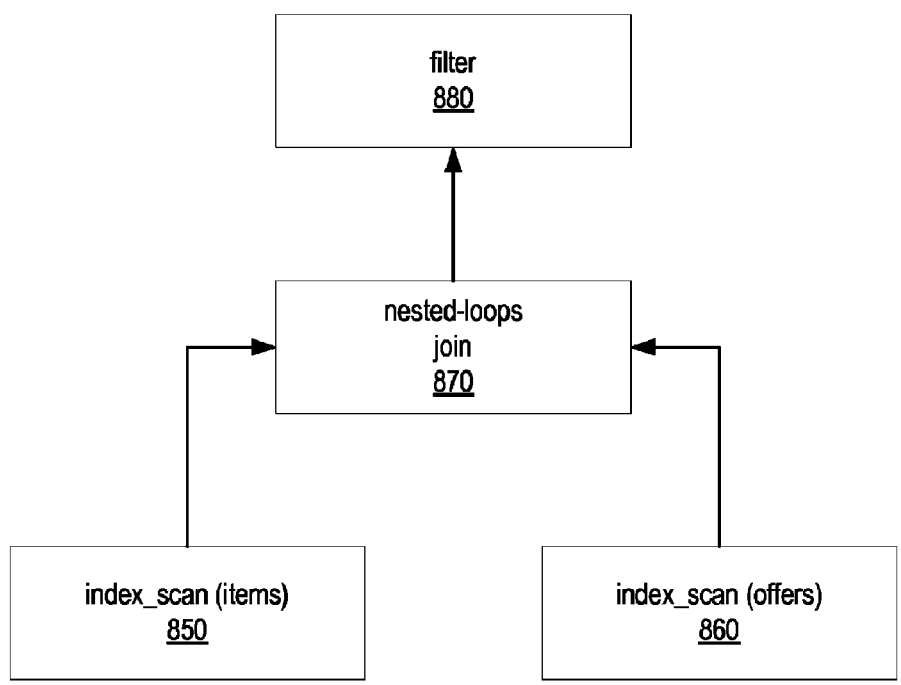

When transforming a logical plan into a physical plan, the physical properties of the clusters may be taken into account, such as cost estimates for inter-site communication. FIG. 6B illustrates an example of a physical query plan corresponding to the logical plan illustrated in FIG. 6A. In this example, the physical plan consists of stream-based physical operators, the properties of which include order of elements, etc. In this example, index_scan operators are applied to the sets of items (at 850) and offers (860) and intermediate results are joined at 870 using a nested-loop join operator. Finally a filter operator (880) may be applied to the joined intermediate results to produce the results of the query.

As previously described, a query may consist of a network of communicating processes representing a physical query plan. In order to facilitate distributing these processes, the functionality may in some embodiments be encapsulated. Physical operators may correspond to the level of granularity at which functionality is encapsulated, in some embodiments. As noted above, each physical operator may be implemented as an iterator and each iterator may be a separate process of the distributed query processing system.

Iterators may provide a uniform framework for implementation of physical operators. For example, all iterators may provide the same abstract functionality regardless of the operator logic that they implement. Therefore, physical query plans may be easily composed by combining iterators. This uniform framework may in some embodiments simplify extending, debugging, monitoring, and/or troubleshooting the system. In some embodiments, iterators may implement only a few operations, such as init, getNext, and close. The use of iterators may also allow encapsulation at fine granularity. This may facilitate parallelization, since iterators may naturally break down query plans into parallelizable units. The use of iterators in queries may in some embodiments provide a framework for including user-defined operators, which may enable embedding and/or parallelizing of user-defined logic (e.g., application logic).

Figure 7A:
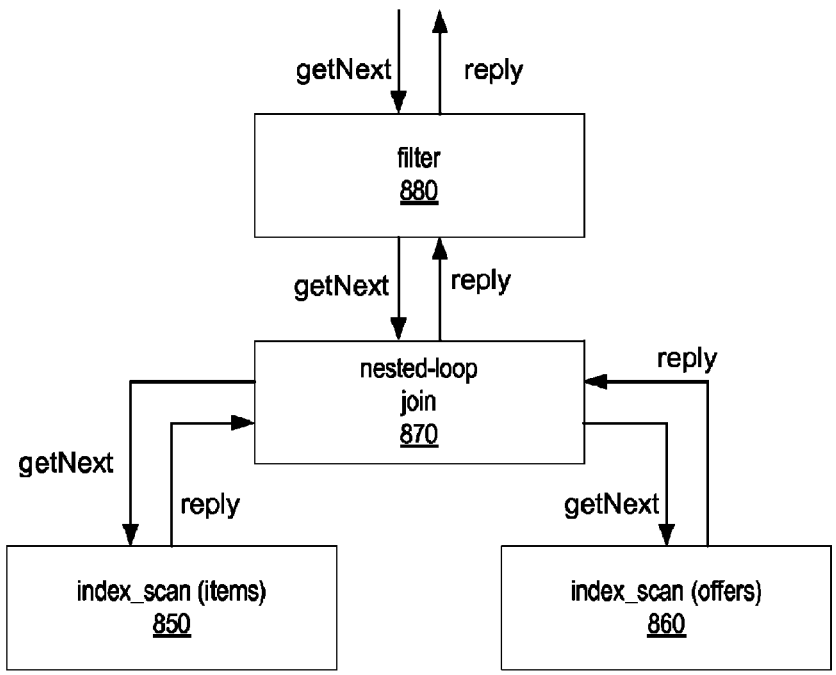
FIGS. 7A and 7B illustrate iterator concepts, according to one embodiment.
Figure 7B:
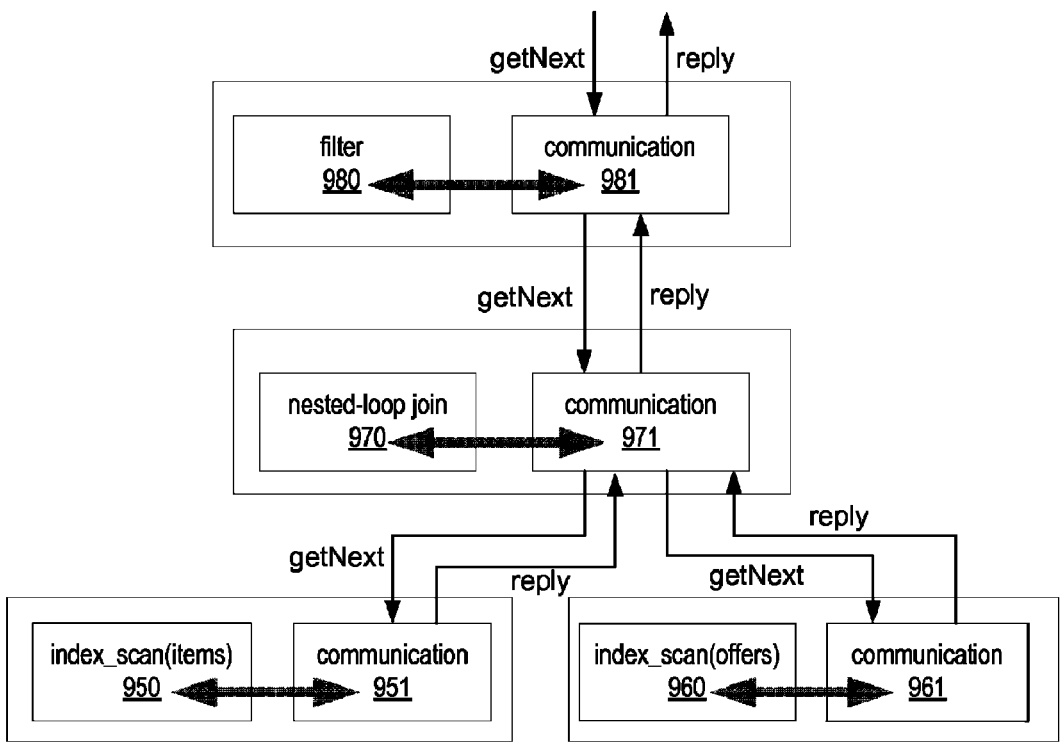

These concepts may be more clearly illustrated by the examples depicted in FIGS. 7A and 7B. FIG. 7A illustrates a physical query plan consisting of a join 870 over index accesses on items (850) and offers (860), followed by a filter 880. This is similar to the physical query plan illustrated in FIG. 6B. In this example, however, iterators are shown directly calling producers via a getNext API.

In order to execute the query illustrated by FIG. 7A, the top iterator's init-API (not shown) may be called, and this call may be propagated to all children (which may in turn call their own children, etc.). After the init phase, data may be retrieved from the query by calling getNext on the top-most operator, in this example. Again, the call may be propagated to the iterator's children, as shown in FIG. 7A.

In the example illustrated in FIG. 7A, whenever an iterator can return data, it may do so by directly replying with the data. In some embodiments iterators that implement blocking operators may consume all data from their children before answering a getNext call. Additionally, a getNext call may in some embodiments pass run-time parameters to an iterator. In this way, entire queries, as well as sub-queries, may be bound (i.e., they may contain variables that are bound at execution time to a transient parameter). The concept of run-time parameters in a query plan may in some embodiments increase the re-usability of plans, as queries that differ only in constants may pass these parameters. The use of run-time parameters may also enable a number of performance enhancements, such as index-lookup-joins. In the example illustrated in FIG. 7A, after all data is retrieved, the query may be shut down by calling a close-API, which may be propagated to all children (not shown).

Due to the distributed nature of the system described herein, queries may be likely to be spread across a larger number of nodes. In other words, iterators on one node may be very likely to communicate with iterators on a remote node. Therefore, the system described herein may abstract the actual communication between processes (i.e., the propagation of calls) out of the iterator mechanism, in some embodiments. FIG. 7B, for example, illustrates the separation of operator logic and communication logic, according to one embodiment. FIG. 7B illustrates the same query plan as that illustrated in FIG. 7A. However, in this example, each iterator includes only its operator logic and corresponding communication units provide communication between processes. In terms of API and order of calls, these iterators may behave similarly to conventional iterators. However, the separation between operator logic and communication logic may in some embodiments simplify implementation of the iterators, and may facilitate extensibility of the system.

Various embodiments of the system described herein may include different numbers of iterators. For example, various embodiments may provide any or all of the following iterators:

query root—each query segment may include a query root iterator as its root. This iterator may communicate with the requestors to accept requests and return data. It may not perform any logical operations on data.

index_access—this iterator may either access the latest version of data only (if in tip mode) or the entire history (if in archive mode), according to a key. The index_access iterator may in some embodiments allow the requestor to pass an interval constraint for the key range.

constant_collection—this iterator may return data from a statically defined rowset and may be used to introduce external user data into a query plan filter—this iterator may apply a scalar expression that computes a Boolean function on each row of its input stream. The current set of parameters for the filter may in some embodiments be passed to the function and may be used in the function evaluation.

nested-loop joins—this iterator may combine two inputs based on a predicate, i.e., it may be decomposed into a cross product of its inputs and the subsequent application of a filter predicate. This iterator may request an outer row from its child and iterate over all inner rows, evaluating the predicate. Once the inner side is exhausted, the next row on the outer side may be requested, etc. The choice as to which input is the inner side and which is the outer side may in some embodiments affect optimization.

write_access—this iterator implements all write operations within the query processor. In some embodiments, this iterator may operate on two columns of input tuples, referred to as "data" and "action," where data contains a valid key and action specifies what kind of write operation to apply to data (e.g., insert data as a new version, merge data, insert new version without data content, or delete data).

top—this iterator may return the first N tuples of its input stream and may be a non-blocking iterator.

sort—this iterator may establish a sort order on its output stream.

spool—this iterator may buffer all input tuples before returning them in the same order to the requesting iterator.

remote sub-query—this iterator may execute a query segment in a separate query scope, as defined in more detail herein.

system collection—this iterator may implement data sources that expose internal in-memory data structures, such as for requests assigned to request handlers in a query server process.

In this example, QxRow may be the current input row of the associated iterator if it is unary, or QxRowLeft, QxRowRight if the operator is binary. QxParamSet may denote the set of parameters that are passed as part of the request. These parameters may be externally provided (e.g., by the client application) or may be internally provided (e.g., by another iterator). For example, parameters for a query in which the query text itself is parameterized may be provided by the client, while parameters for a query involving index lookup joins may be passed as partial results from one sub-plan to another.

As previously noted, the distributed query processing framework described herein may be extensible to include any other operators suitable for implementing various query functions in a distributed database system.

Distributed Query Life-Cycle

As noted above, a database query posed in a declarative query language (e.g., SQL, XQuery) may be translated into a query plan (i.e., a network of relational algebra operators), which may be executed on one or more remote nodes. The general workflow for the system and methods described herein is similar to that typically in query processing, and may involve the following four steps:

generate a query execution plan (i.e., compilation)

instantiate the plan (i.e., allocate all resource needed for execution)

execute the plan (i.e., process the data)

release the resources

The life-cycle of a query request, according to one embodiment, is illustrated in FIGS. 8A-8E. In this example, the operations illustrated in FIG. 3, and described above, are described again in terms of various nodes to which they may apply in a distributed query processing system.

Figure 8A:
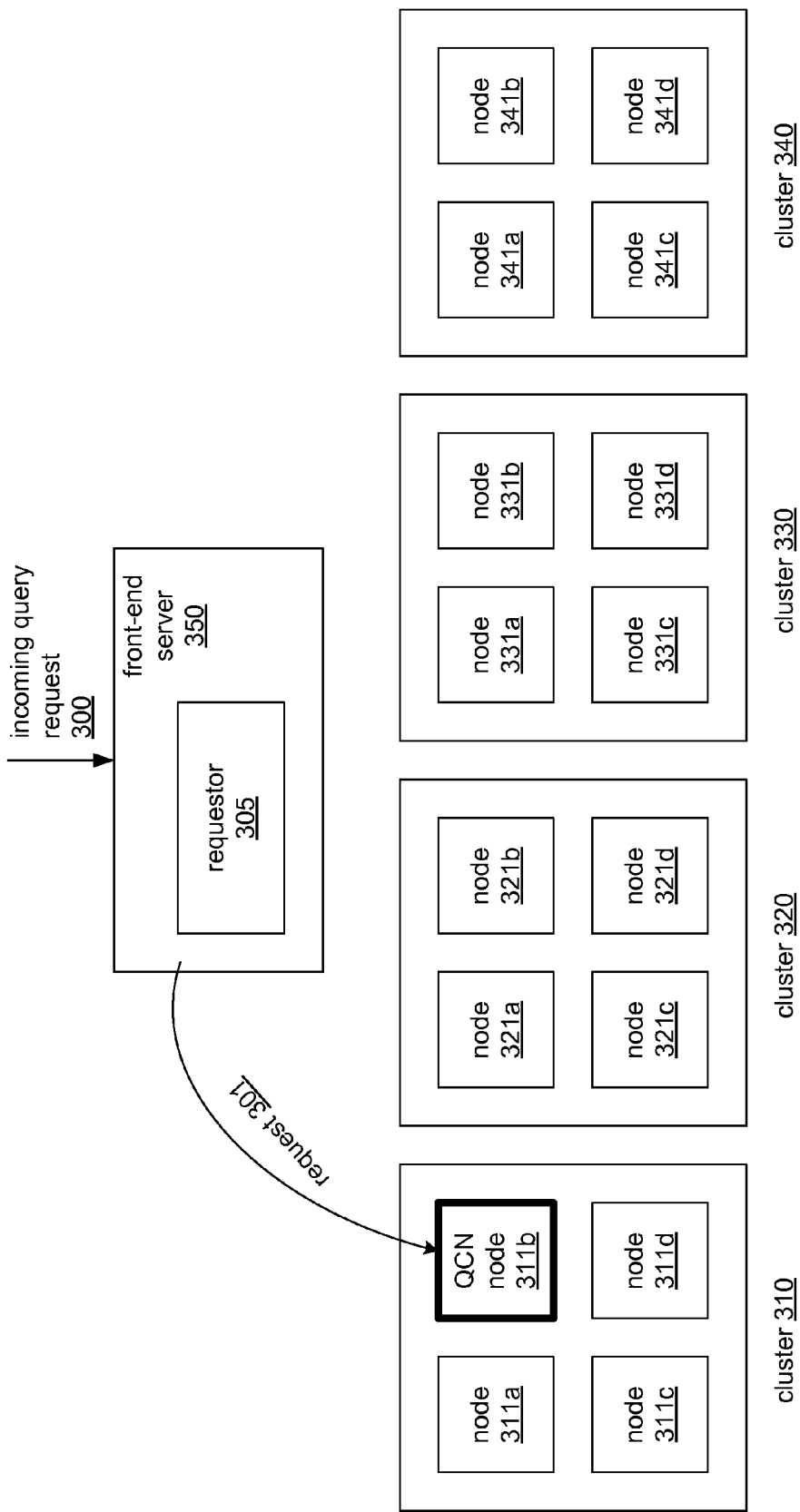
FIGS. 8A-8E illustrate a query life-cycle, according to one embodiment.

In the example illustrated in FIG. 8A, incoming query request 300 maybe received from a client application via front-end server 350. Front-end server 350 may serve as a proxy (requestor) for the client application, shown as 305. As a proxy for the client application, requestor 305 may submit the query and consume the results. As noted above, an incoming query request may in some embodiments be routed to any node in the fleet. FIG. 8A illustrates data grid that includes four clusters (310, 320, 330, and 340), each including four query processing nodes (311*a*-311*d*, 321*a*-321*d*, 331*a*-331*d*, and 341*a*-341*d*). In other embodiments any number of clusters may be included in a data grid and any number of query processing nodes may be included in each cluster.

In this example, incoming query request 300 may be translated into a particular standard query language and output as request 301. For example, in some embodiments the system may represent user and/or application data as XML. In some embodiments, the system may accept a rather board variety of input formats, and may convert all data to XML as part of a preprocessing phase. This may be performed by a front-end service, in some embodiments, such as one executing on front-end server 350. In other embodiments, incoming query request may not need translation before it is routed to a query processing node. As illustrated in FIG. 6A, request 301 may be routed to node 311*b*, which becomes a query coordinator node (QCN) for this query. The node to which the request is routed may in some embodiments be chosen according to a load balancing strategy. In other embodiments, the node may be chosen using other criteria or may be chosen at random. On coordinator node 311*b*, the request may be parsed and compiled to generate a query plan, as described above, and a distributed network of communicating processes may be instantiated.

Figure 8B:
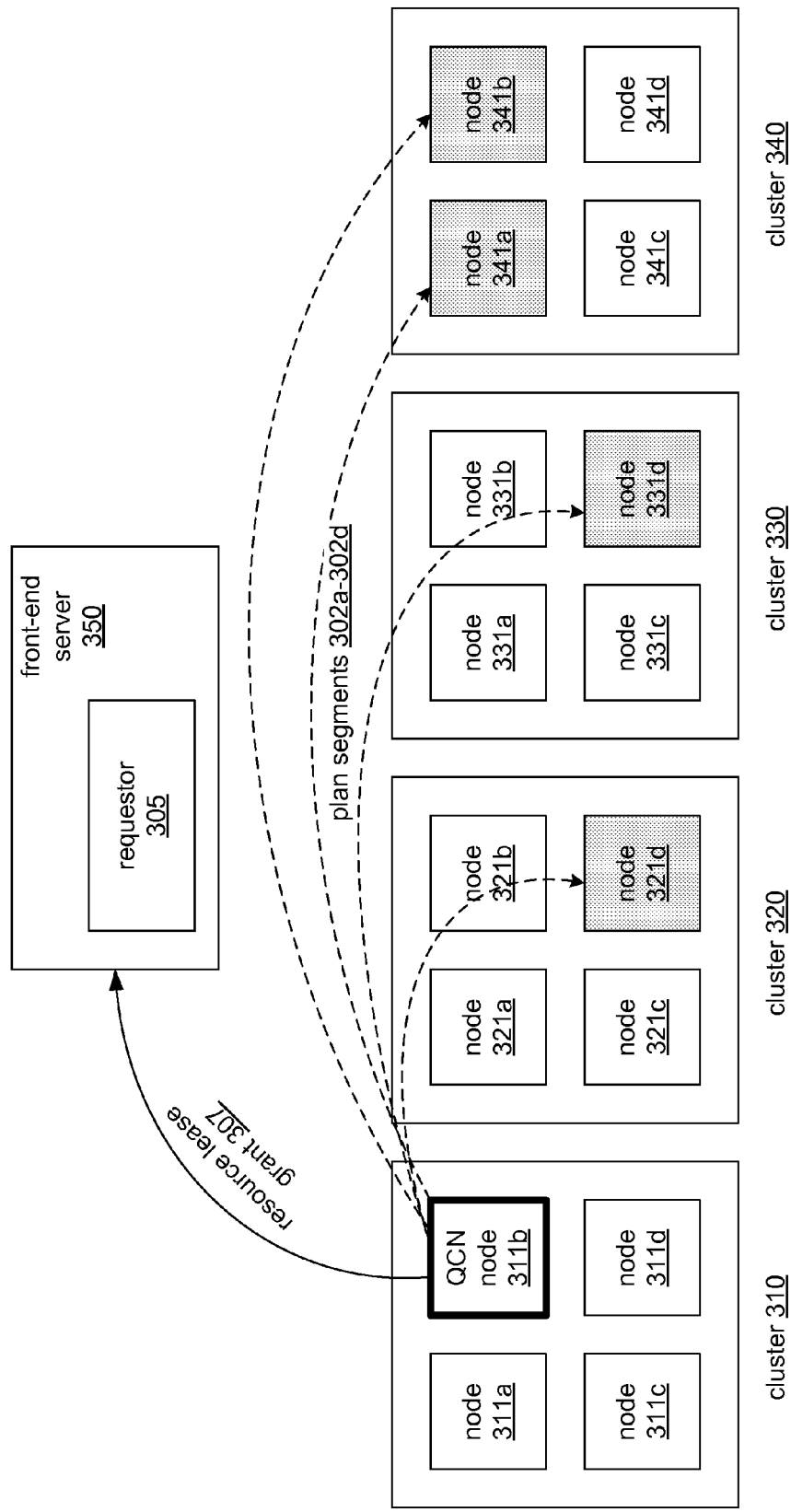

An optimizer on coordinator node 311*b* may divide the query plan into different segments, which may be executed on remote nodes according to metadata accessed at runtime, as described above. FIG. 8B illustrates plan segments 302*a*-302*d* being instantiated on target nodes 321*d*, 331*d*, 341*a*, and 341*b*, respectively. Once the query instance is functional, the QCN may grant a resource lease to the requestor, shown as 307 in FIG. 8B.

Figure 8C:
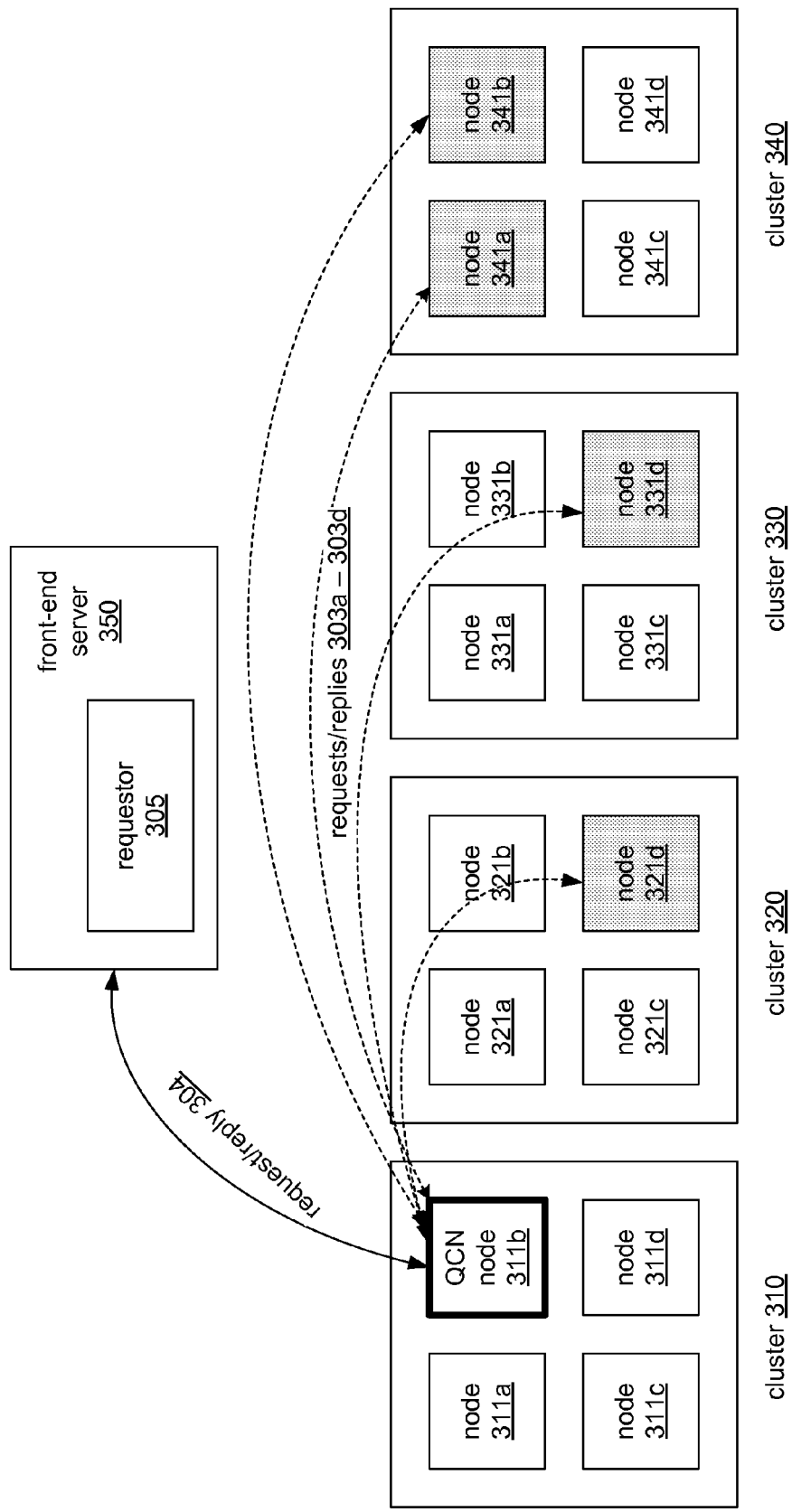
Figure 8D:
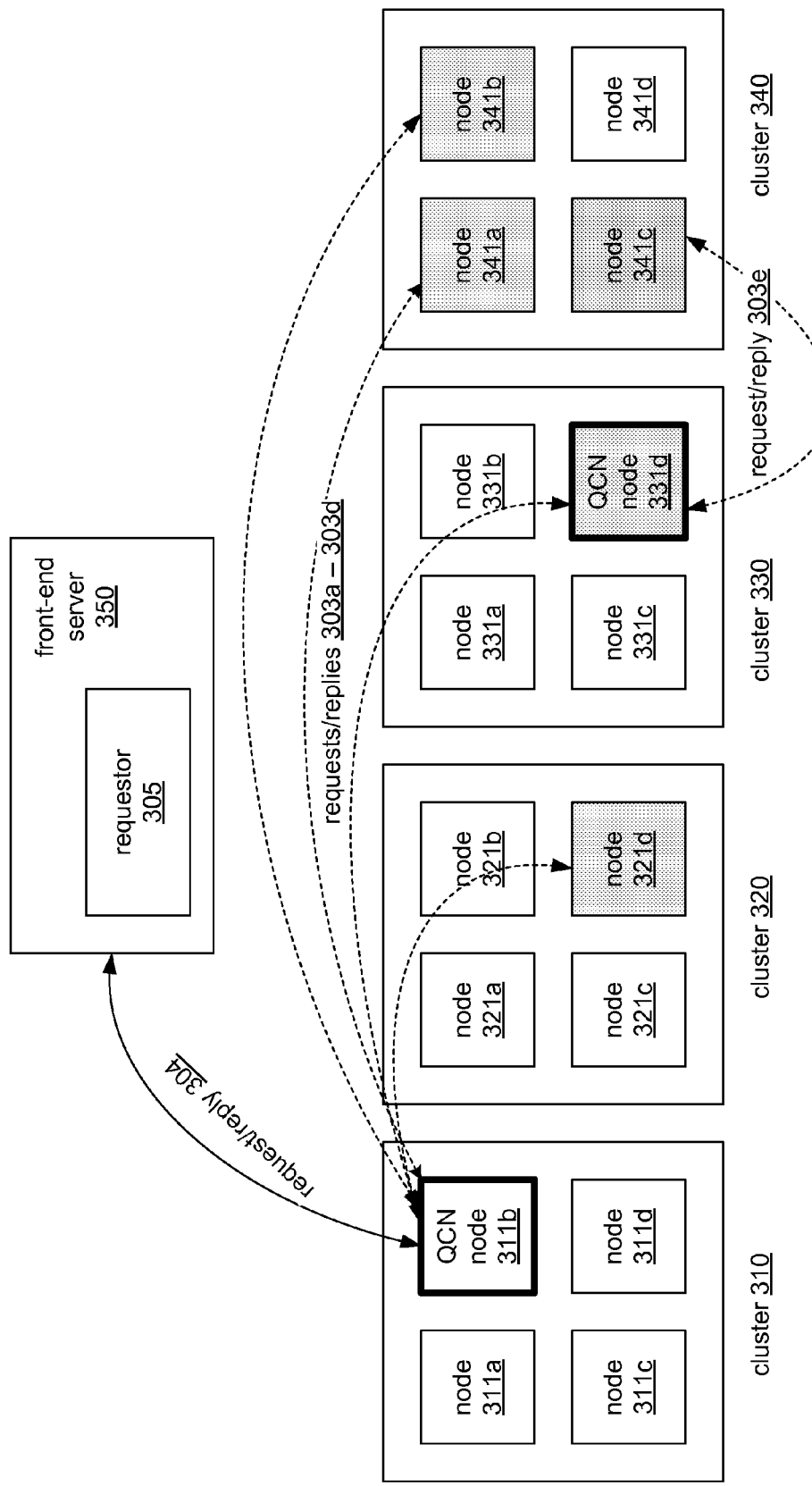

Request handlers on the individual target nodes may execute the query logic in the distributed plan segments 302*a*-302*b* and may produce results on demand. In other words, every request activates processing at the distributed request handlers. As illustrated in FIG. 8C, individual results may be returned to the QCN as they become available, shown as 303*a*-303*d*. The QCN may then return results to the requestor (shown at 304) as are they are received. The QCN may also be responsible for coordinating the requesting and consuming of data from any subordinate requests. For example, as part of the processing, any participating query processor instance may become a QCN for further sub-requests. This is illustrated in FIG. 8D, in which node 331*d* becomes a QCN for a sub-query and instantiates a portion of the query plan on node 341*c*. In this example, requests and replies are exchanged between QCN node 331*d* and node 341C as request/reply 303*e*.

Figure 8E:
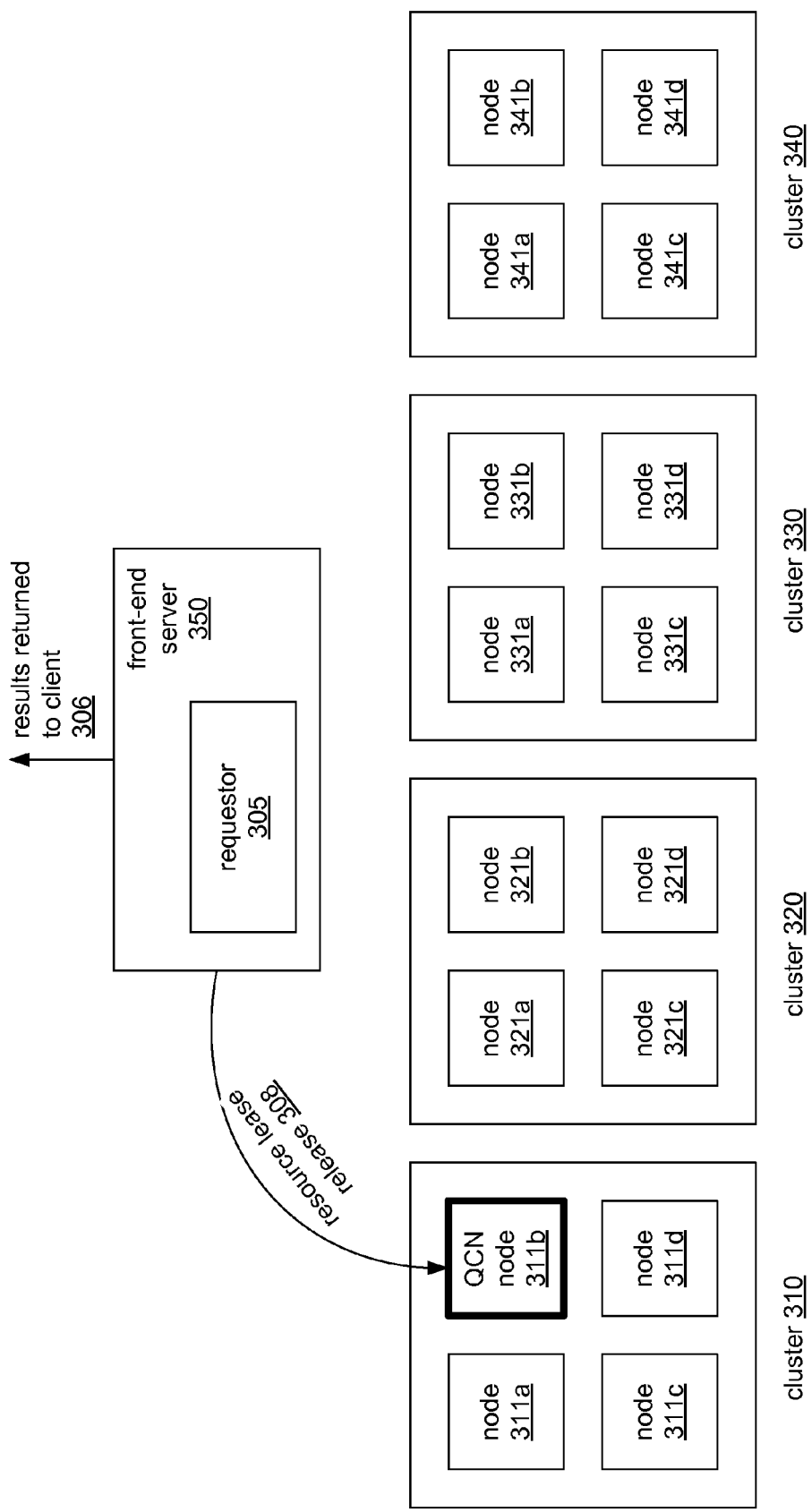

Once the processing is complete, the requestor may relinquish the lease of the query instance, shown as resource lease release 308 in FIG. 8E, which may trigger a clean-up. While the example illustrated in FIG. 8E depicts that results are shipped to the client application (at 306) after the processing of the request is finished, in other embodiments, partial replies may be shipped as soon as they become available.

Query Server Process

As previously noted, the top-level component of the per-node query processing architecture described herein may be the query server process. The query server process may invoke the other previously discussed components and may manage all involved processes, hence, it may also be referred to using the "process management" label.

The query server process may receive incoming requests (both internal and external) and may delegate them to respective components. For example, external requests that are received as query text may in some embodiments be algebraized, optimized and executed. Internal requests (e.g., requests in the form of partial query plans) may in some embodiments be directly referred to the execution engine. As part of this management process, query timeouts and request quotas may be enforced.

The query server process may in some embodiments play a role in the recovery from failures during query processing. For example, query execution processes may terminate unexpectedly and prematurely because of software faults (e.g., crashes), inherently faulty requests (e.g., queries which entail a divide-by-zero exception due to user data), or operational characteristics (e.g., deadlocks). These failures may differ in the extent that they affect the system infrastructure, with a range from the failure of a single operator and/or external component (such as the persistence layer), to server and node failures. The latter may occur intermittently or may be a permanent outage. The process management may in some embodiments ensure that (a) failures are detected within a given time window and (b) error messages with as much detail as possible and necessary are returned to the requestor. In the case of individual query components failing, the responsible query server process may return error information to the requestor. In the case of a complete server or node outage, the requestor may time out and trigger a query abort on the requestor's side, in some embodiments.

As previously noted, the handling of requests and instrumentation of processes may in some embodiments be orchestrated by a query server process on each node. Each query server process may be a fully self-contained query processor and each node may run exactly one query server process.

The query server process on a given node may spawn a process for each request (e.g., a request handler), which in turn handles the actual request. The query server process may not reply to requests itself (unless, for example, they are management requests processing synchronously within the query server process). Rather, the spawned request handlers may in some embodiments communicate with the requestor. The query server process may in some embodiments be responsible for bookkeeping related to requests (e.g., which requests are being worked on by which processes) and for clean-up tasks if any of the request handlers shut down in an unexpected manner. FIGS. 9A-9D illustrate the compilation, instantiation, execution, and completion of a query request by the query server process and/or request handlers, according to one embodiment.

Figure 9A:
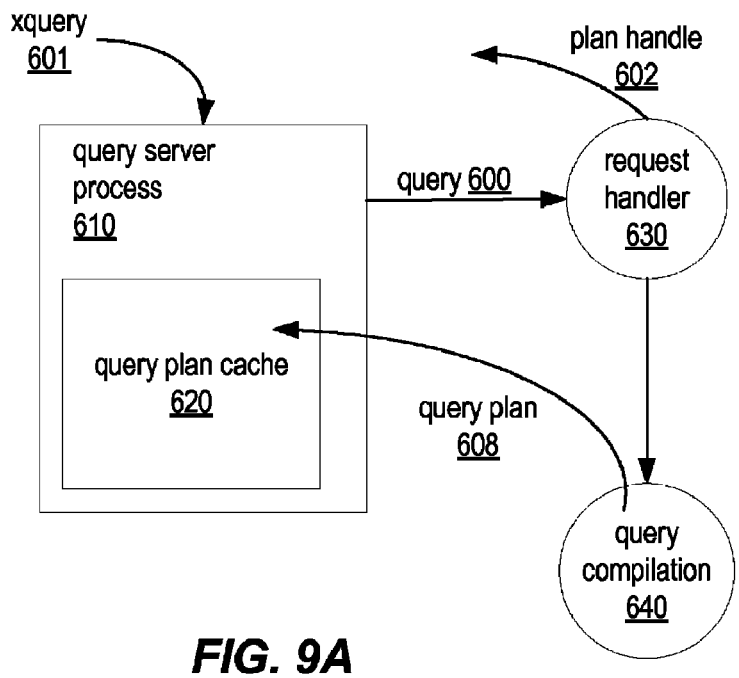
FIGS. 9A-9D illustrate the handling of requests by a query server process, according to one embodiment.

FIG. 9A illustrates the compilation phase of a query request, according to one embodiment. In this example, the query server process 610 may receive a query formatted as an XQuery 601 and may spawn a request handler 630 to handle the query, now formatted as query 600. Request handler 630 may coordinate a compilation process 640, as described herein. The result of the compilation, query plan 608, may be stored in a plan cache 620, and a plan handle 602 may be generated for query plan 608. The child processes (e.g., the compilation process) may be terminated after completion of this phase.

Figure 9B:
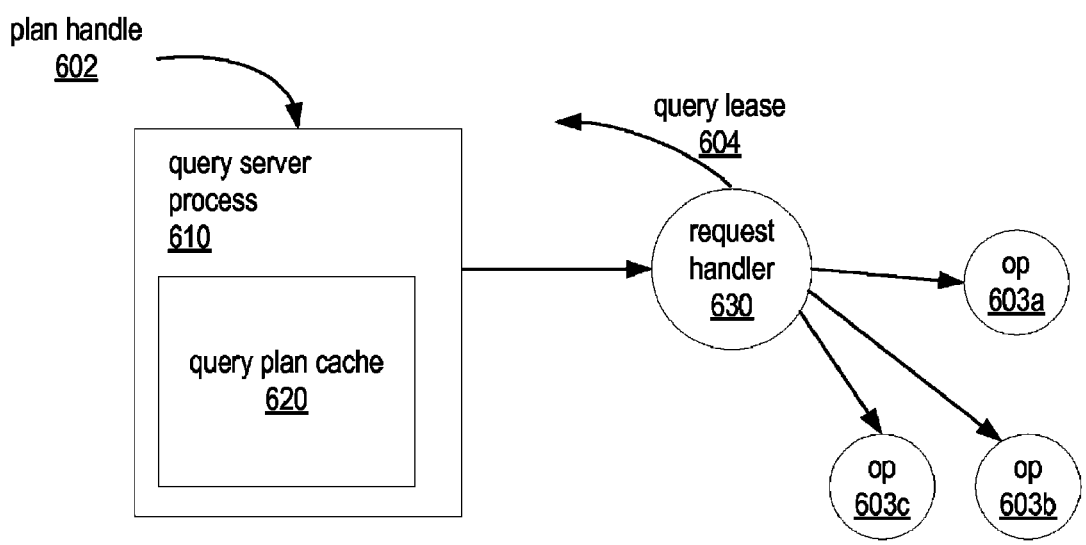

FIG. 9B illustrates the instantiation phase of a query request, according to one embodiment. In this example, in response to a request to instantiate the query plan identified by plan handle 602 (i.e., query plan 608), request handler 630 may instantiate the compiled query plan 608 by spawning operators 603a-603c of query plan 608. An instantiated request may in some embodiments include a complete physical sub-plan, rather than only a plan handle. Such plans may also be cached, in some embodiments. If the operators are spawned to multiple remote nodes, the local node may be promoted to a query coordinator node, and may submit requests to other query server processes as appropriate. Request handler 630 may also communicate the identifier of the root operator back to the requestor as part of query lease 604. Note that previously cached query plans may in some embodiments be instantiated for execution without recompilation, according to current metadata and/or parameter values. In some such embodiments, the cached plans may be referenced by their plan handles.

Figure 9C:
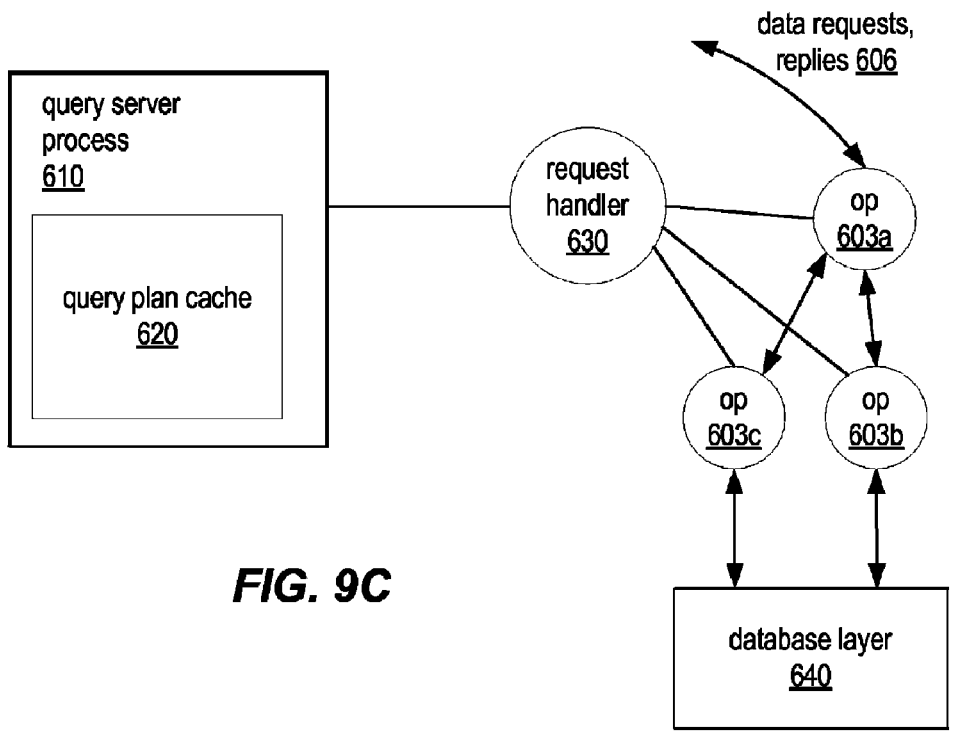

FIG. 9C illustrates the execution phase of a query request, according to one embodiment. In this example, once the query lease 604 has been obtained, the requestor may communicate with the root operator of the query to request data and the root operator may reply with result data as it becomes available. This is shown at 606. The actual execution of the query is supervised by request handler 630 and implemented by operators 603a-603c, as applied to data maintained by database layer 640. Any failures during execution may be detected by request handler 630 and communicated back to the requestor.

Figure 9D:
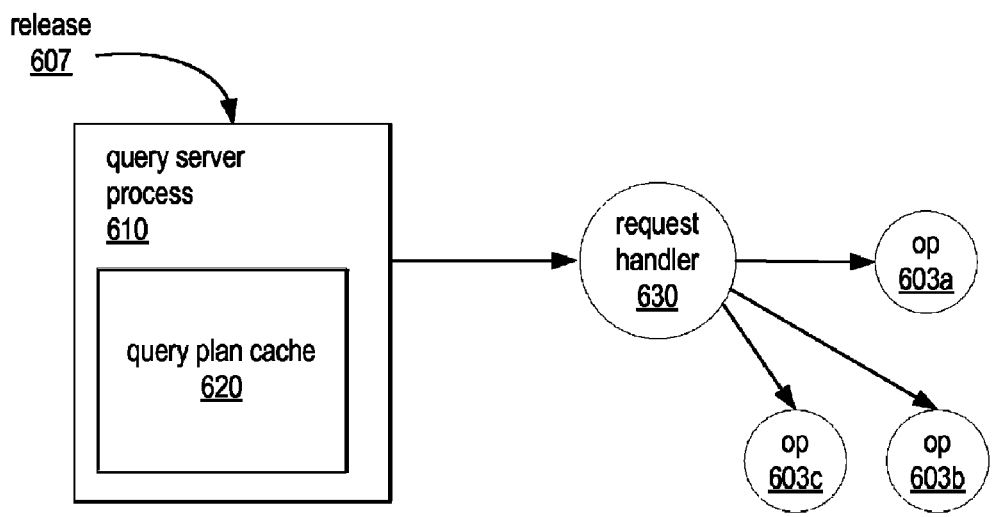

FIG. 9D illustrates the final phase of a query request, according to one embodiment. In this example, once the requestor decides to relinquish the lease (e.g., after all results are consumed) the query server process may trigger a reset of the query. This is shown as release 607. Subsequent to the completion of the reset, the query instance may in some embodiments be leased to another requestor.

Programmability

In addition to providing a query language for data access, the system described herein may in some embodiments allow the application developer to register native code in the form of user-defined functions (UDFs). These functions may be referenced from within any given query. That is, a user-defined function may be applied to data as specified by a query and its result may be further processed within the query, just as with any built-in functions. This feature may enable integration of custom logic into query processing, in some embodiments. For example, custom logic may become part of a query and may be distributed over the grid and executed in parallel as part of a regular query, where applicable. Integrating programmability with the query processor in this fashion may in some embodiments provide fine-grain parallelism and may contribute to more efficient resource utilization.

Sample Computing Node

Figure 10:
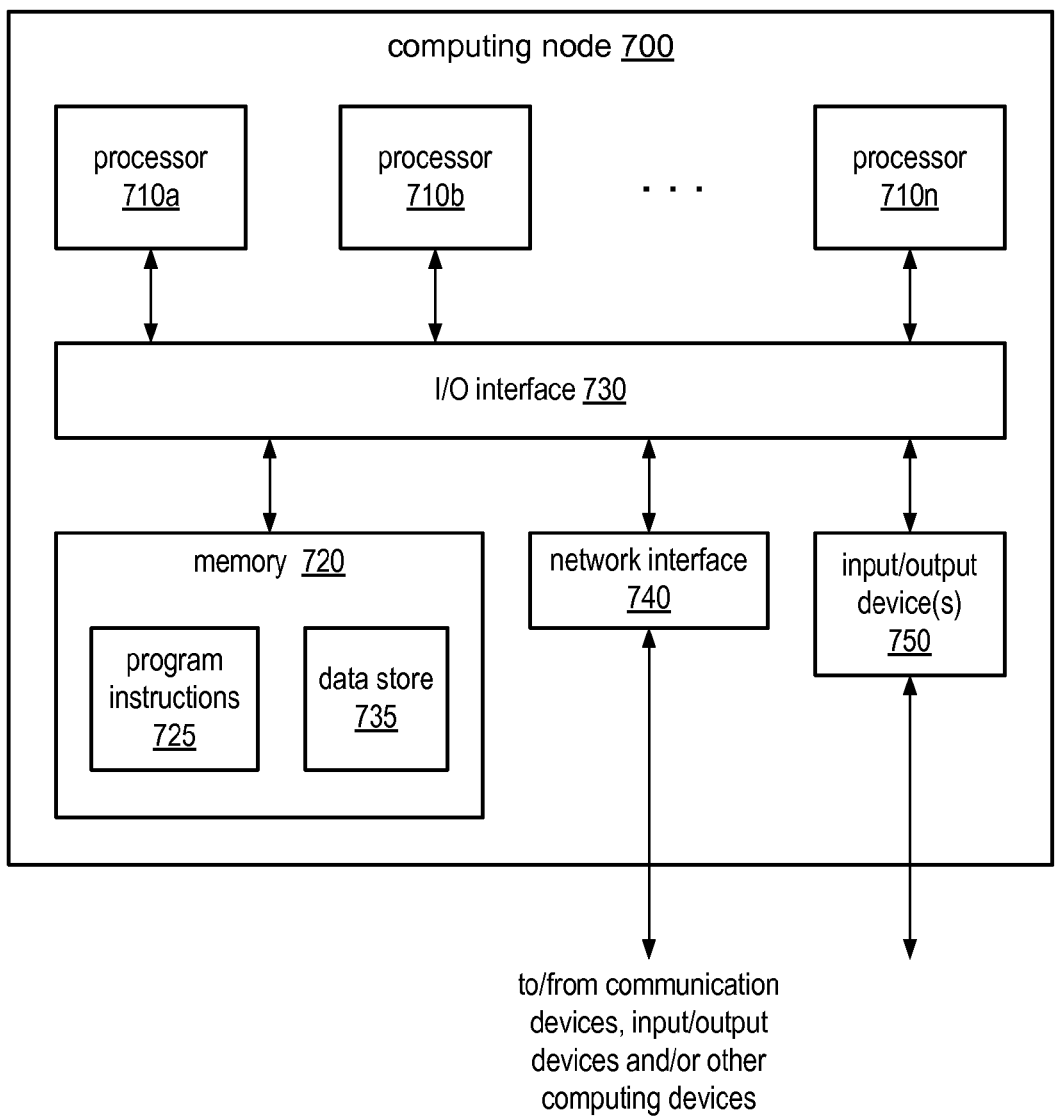
FIG. 10 is a block diagram illustrating one embodiment of a computing node suitable for implementing distributed query processing.

Distributed query processing, as described herein, may be executed by a collection of computing nodes, one or more of which may be configured to implement a front-end server, such as front-end server 110 of FIG. 1, and others of which may be configured to implement query processing nodes, such query processing nodes 120 of FIG. 1, according to various embodiments. One such computing node is illustrated in FIG. 10. In the illustrated embodiment, computing node 700 includes one or more processors 710 coupled to a system memory 720 via an input/output (I/O) interface 730. Computing node 700 further includes a network interface 740 coupled to I/O interface 730, and one or more input/output devices 750. In some embodiments, a given node may implement the functionality of more than one component of distributed query processing. For example, a single node may in some embodiments serve as both a front-end server and a query processing node. In another example, a single node may host both a client application that may submit query requests and a front-end server and/or query processor that may process query requests. While several of the examples described herein include a grid computing system, the methods described herein may be implemented on any other configurations of server and/or query processing nodes suitable for implementing a distributed database across a collection of shared resources.

In various embodiments a computing node 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA. Similarly, in a grid computing system such as that described herein, each of the fleet of nodes may implement the same ISA, or individual nodes and/or clusters of nodes may implement different ISAs.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. For example, program instruction 725 may include any or all of a front-end server process, a user interface, a load-balancing service, a distributed database, a query processor (including a query server process, a query plan compiler, a query plan optimizer, and an execution engine), or a client application. Data storage 735 may in various embodiments include collections of data maintained by a distributed database and/or metadata used by the distributed query processing system described herein. In other embodiments, program instructions and/or data may be received, sent or stored upon different types of computer-accessible media or on similar media separate from system memory 720 or computing node 700. Generally speaking, a computer-accessible medium may include storage media or memory media such as magnetic or optical media, e.g., disk or CD/DVD-ROM coupled to computing node 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing node 700 and other devices attached to a network, such as other computer systems, or between other nodes in a shared resource system (e.g., a grid computing system). In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computing nodes 700. Multiple input/output devices 750 may be present in computing node 700 or may be distributed on various nodes of a shared resource system or grid computing system. In some embodiments, similar input/output devices may be separate from computing node 700 and may interact with one or more nodes of a shared resource system through a wired or wireless connection, such as over network interface 740.

Users may interact with the distributed database system in various ways in different embodiments, such as to submit query requests and receive results. For example, some users may have physical access to computing node 700, and if so, may interact with various input/output devices 750 to provide and/or receive information. Alternatively, other users may use client computing systems to access the distributed database, such as remotely via network interface 740 (e.g., via the Internet and/or the World Wide Web). In addition, some or all of the distributed database system components may provide various feedback or other general types of information to users (e.g., in response to user requests) via one or more input/output devices 750.

Those skilled in the art will appreciate that computing node 700 is merely illustrative and is not intended to limit the scope of the present invention. In particular, the computing system and devices may include any combination of hardware or software that can perform the indicated functions, including computers, network devices, internet appliances, PDAs, wireless phones, pagers, etc. Computing node 700 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing node 700 may be transmitted to computing node 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer accessible storage medium, other aspects may likewise be so embodied.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computing system, comprising:
a plurality of query processing nodes, each comprising:
a query processor; and
a portion of a distributed storage system, wherein the distributed storage system comprises data stored on each of the plurality of query processing nodes;
wherein the query processor of one of the plurality of query processing nodes is configured to:
receive a query request;
generate a query plan for execution of the query request, wherein to generate the query plan, the query processor is configured to parse or translate the received query request, wherein the query plan generated by the query processor is not dependent on locations of data in the distributed storage system, wherein the query plan is generated such that the particular query processing nodes on which segments of the query plan are to be instantiated are not determined until the query plan is carried out; and
when the query plan is carried out:
instantiate a segment of the query plan on each of one or more others of the plurality of query processing nodes, wherein instantiating comprises determining the query processing node on which each segment is to be instantiated;
receive query results from each of the one or more others of the plurality of query processing nodes; and
return the query results.

2. The system of claim 1, wherein the query plan generated by the query processor is not dependent on a hardware configuration of the plurality of query processing nodes of the system.

3. The system of claim 1, wherein to generate the query plan, the query processor is further configured to transform the received query request into a target algebra for the query processor.

4. The system of claim 1, wherein to generate the query plan, the query processor is further configured to optimize the query plan independent of the hardware configuration of the plurality of query processing nodes and independent of locations of data in the distributed storage system.

5. The system of claim 1, wherein to generate the query plan, the query processor is further configured to divide the query plan into executable query plan segments.

6. The system of claim 1, wherein the query plan comprises remote sub-query operators, and wherein to determine the query processing node on which each segment is instantiated, the remote sub-query operators are configured to access metadata indicating a location of one or more data partitions in the distributed storage system when the query plan is carried out.

7. The system of claim 6, wherein the metadata is maintained on the one of the plurality of query processing nodes.

8. The system of claim 1, wherein one of the one or more others of the plurality of query processing nodes is configured to:
instantiate a segment of the query plan on another one of the one or more others of the plurality of query processing nodes;
receive query results from the another one of the one or more others of the plurality of query processing nodes; and
return the query results received from the another one of the one or more others of the plurality of query processing nodes to the one of the plurality of query processing nodes.

9. The system of claim 1, wherein the one of the plurality of query processing nodes is further configured to:
grant a resource lease to a requestor on whose behalf the query request was received subsequent to the query processor instantiating a segment of the query plan on each of one or more others of the plurality of query processing nodes; and
release the leased resources in response to the requestor relinquishing the resource lease.

10. The system of claim 1, further comprising a front-end server configured to implement one or more of: an interface between a client application requesting data and the plurality of query processing nodes, a query request parser, a query request translator, a load-balancing service configured to submit requests received on behalf of a client application to the one of the plurality of query processing nodes, an authentication service configured to determine ownership of query requests, a query request quota monitoring service, and a query request timeout service.

11. The system of claim 1, wherein the plurality of query processing nodes are part of a grid computing system.

12. The system of claim 1, wherein the query request comprises a user-defined function for operating on data maintained by the distributed storage system.

13. The system of claim 1, wherein the plurality of query processing nodes are grouped in clusters, each cluster comprising a master node for a given data partition in the distributed storage system, and each other node in the cluster comprising a replica of the given data partition.

14. The system of claim 13, wherein if the master node for a given data partition fails, the other nodes in the cluster are configured to elect a new master node, and wherein a query plan segment targeted for instantiation on the master node is instantiated on the new master node without the query plan being recompiled in response to the master node failing.

15. The system of claim 1, wherein the distributed storage system comprises a plurality of data partitions, and wherein each data partition is replicated on two or more of the plurality of query processing nodes without the distributed storage system being fully replicated on any of the plurality of query processing nodes.

16. The system of claim 1, wherein the query processor is further configured to:
store the query plan for re-use; and
instantiate a segment of the stored query plan on each of one or more others of the plurality of query processing nodes in response to receiving a second query request of a same type as the query request, wherein the query processing node on which each segment of the stored query plan is instantiated is determined when the stored query plan is carried out.

17. A computer-implemented method, comprising:
receiving a query request;
generating a query plan for execution of the query request, generating the query plan comprises parsing or translating the received query request, wherein the generated query plan is not dependent on a hardware configuration of the plurality of query processing nodes, wherein the query plan is generated such that the particular query processing nodes on which segments of the query plan are to be instantiated are not determined until the query plan is carried out; and when the query plan is carried out:
  instantiating a segment of the query plan on each of one or more of a plurality of query processing nodes configured to implement a distributed data storage system, wherein said instantiating comprises determining the query processing node on which each segment is to be instantiated;
  receiving query results from each of the one or more of the plurality of query processing nodes; and
  returning the query results.

18. The method of claim 17, wherein the generated query plan is not dependent on locations of data in the distributed data storage system.

19. The method of claim 17, wherein said generating the query plan comprises transforming the received query request into a target algebra for the plurality of query processing nodes.

20. The method of claim 17, wherein said generating the query plan comprises optimizing the query plan, and wherein said optimizing is independent of the hardware configuration of the plurality of query processing nodes and independent of locations of data in the distributed data storage system.

21. The method of claim 17, wherein said generating the query plan comprises dividing the query plan into executable query plan segments.

22. The method of claim 17, wherein the query plan comprises remote sub-query operators, and wherein said determining the query processing node on which each segment is instantiated comprises the remote sub-query operators accessing metadata indicating a location of one or more data partitions in the distributed data storage system when the query plan is carried out.

23. The method of claim 22, wherein the metadata is maintained on one or more of the plurality of query processing nodes.

24. The method of claim 17, further comprising one of the one or more of the plurality of query processing nodes:
  instantiating a segment of the query plan on another one of the plurality of query processing nodes;
  receiving query results from the another one of the plurality of query processing nodes; and
  returning the query results received from the another one of the plurality of query processing nodes.

25. The method of claim 17, further comprising:
  granting a resource lease to a requestor on whose behalf the query request was received subsequent to said instantiating a segment of the query plan on each of the one or more of the plurality of query processing nodes; and
  releasing the leased resources in response to the requestor relinquishing the resource lease.

26. The method of claim 17, wherein the query request comprises a user-defined function for operating on data maintained by the distributed data storage system.

27. The method of claim 17, wherein the plurality of query processing nodes are grouped in clusters, each cluster comprising a master node for a given data partition in the distributed data storage system, and each other node in the cluster comprising a replica of the given data partition.

28. The method of claim 27, wherein in response to the master node for a given data partition failing, the method further comprises:
  the other nodes in the cluster electing a new master node; and
  instantiating a query plan segment targeted for instantiation on the master node on the new master node without the query plan being recompiled in response to the master node failing.

29. The method of claim 17, wherein the distributed data storage system comprises a plurality of data partitions, and wherein each data partition is replicated on two or more of the plurality of query processing nodes without the distributed storage system being fully replicated on any of the plurality of query processing nodes.

30. The method of claim 17, further comprising:
  storing the query plan for re-use; and
  instantiating a segment of the stored query plan on each of one or more of the plurality of query processing nodes in response to receiving a second query request of a same type as the query request, wherein the query processing node on which each segment of the stored query plan is instantiated is determined when the stored query plan is carried out.

31. A computer-readable storage medium, comprising computer-executable program instructions configured to implement:
  receiving a query request;
  generating a query plan for execution of the query request, wherein generating the query plan comprises parsing or translating the received query request, wherein the generated query plan is not dependent on locations of data in the distributed storage system, wherein the query plan is generated such that the particular query processing nodes on which segments of the query plan are to be instantiated are not determined until the query plan is carried out; and
  when the query plan is carried out:
    instantiating a segment of the query plan on each of one or more of a plurality of query processing nodes configured to implement a distributed data storage system, wherein said instantiating comprises determining the query processing node on which each segment is to be instantiated;
    receiving query results from each of the one or more of the plurality of query processing nodes; and
    returning the query results.

32. The storage medium of claim 31, wherein the generated query plan is not dependent on a hardware configuration of the plurality of query processing nodes in the distributed data storage system.

33. The storage medium of claim 31, wherein said generating the query plan comprises transforming the received query request into a target algebra for the plurality of query processing nodes.

34. The storage medium of claim 31, wherein said generating the query plan comprises optimizing the query plan, and wherein said optimizing is independent of the hardware configuration of the plurality of query processing nodes and independent of locations of data in the distributed data storage system.

35. The storage medium of claim 31, wherein said generating the query plan comprises dividing the query plan into executable query plan segments.

36. The storage medium of claim 31, wherein the query plan comprises remote sub-query operators, wherein said determining the query processing node on which each segment is instantiated comprises the remote sub-query operators in the query plan accessing metadata indicating a location of one or more data partitions in the distributed data storage system when the query plan is carried out, and wherein the metadata is maintained on one or more of the plurality of query processing nodes.

37. The storage medium of claim 31, wherein the program instruction are further configured to implement one of the one or more of the plurality of query processing nodes:

instantiating a segment of the query plan on another one of the plurality of query processing nodes;

receiving query results from the another one of the plurality of query processing nodes; and returning the query results received from the another one of the plurality of query processing nodes.

38. The storage medium of claim 31, wherein the program instruction are further configured to implement:

granting a resource lease to a requestor on whose behalf the query request was received subsequent to said instantiating a segment of the query plan on each of the one or more of the plurality of query processing nodes; and releasing the leased resources in response to the requestor relinquishing the resource lease.

39. The storage medium of claim 31, wherein the query request comprises a user-defined function for operating on data maintained by the distributed data storage system.

40. The storage medium of claim 31, wherein the plurality of query processing nodes are grouped in clusters, each cluster comprising a master node for a given data partition in the distributed data storage system, and each other node in the cluster comprising a replica of the given data partition.

41. The storage medium of claim 40, wherein the program instruction are further configured to implement:

in response to the master node for a given data partition failing, the other nodes in the cluster electing a new master node; and instantiating a query plan segment targeted for instantiation on the master node on the new master node without the query plan being recompiled in response to the master node failing.

42. The storage medium of claim 31, wherein the distributed data storage system comprises a plurality of data partitions, and wherein each data partition is replicated on two or more of the plurality of query processing nodes without the distributed storage system being fully replicated on any of the plurality of query processing nodes.

43. The storage medium of claim 31, wherein the program instruction are further configured to implement:

storing the query plan for re-use; and instantiating a segment of the stored query plan on each of one or more of the plurality of query processing nodes in response to receiving a second query request of a same type as the query request, wherein the query processing node on which each segment of the stored query plan is instantiated is determined when the stored query plan is carried out.

44. A query processing node, comprising:

a query processor; and a portion of a distributed storage system, wherein the distributed storage system comprises data stored on each of a plurality of query processing nodes;

wherein the query processor is configured to:

receive a query request;

generate a query plan for execution of the query request, wherein to generate the query plan, the query processor is configured to parse or translate the received query request, wherein the query plan generated by the query processor is not dependent on a hardware configuration of the plurality of query processing nodes, wherein the query plan is generated such that the particular query processing nodes on which segments of the query plan are to be instantiated are not determined until the query plan is carried out; and when the query plan is carried out:

instantiate a segment of the query plan on each of one or more others of the plurality of query processing nodes, wherein instantiating comprises determining the query processing node on which each segment is to be instantiated;

receive query results from each of the one or more others of the plurality of query processing nodes; and return the query results.

45. The query processing node of claim 44, wherein the query plan generated by the query processor is not dependent on locations of data in the distributed storage system.

46. The query processing node of claim 44, wherein to generate the query plan, the query processor is further configured to:

transform the received query request into a target algebra for the query processor;

optimize the query plan independent of the hardware configuration of the plurality of query processing nodes and independent of locations of data in the distributed storage system; and divide the query plan into executable query plan segments.

47. The query processing node of claim 44, wherein the query plan comprises remote sub-query operators, and wherein to determine the query processing node on which each segment is instantiated, the remote sub-query operators are configured to access metadata maintained on the query processing node indicating a location of one or more data partitions in the distributed storage system when the query plan is carried out.

48. The query processing node of claim 44, wherein the query processor is further configured to:

grant a resource lease to a requestor on whose behalf the query request was received subsequent to the query processor instantiating a segment of the query plan on each of one or more others of the plurality of query processing nodes; and release the leased resources in response to the requestor relinquishing the resource lease.

49. The query processing node of claim 44, wherein the query processor is further configured to:

store the query plan for re-use; and instantiate a segment of the stored query plan on each of one or more others of the plurality of query processing nodes in response to receiving a second query request of a same type as the query request, wherein the query processing node on which each segment of the stored query plan is instantiated is determined when the stored query plan is carried out.

* * * * *